(12) United States Patent
Kishimoto

(10) Patent No.: US 10,135,056 B2
(45) Date of Patent: Nov. 20, 2018

(54) ENERGY STORAGE DEVICE

(71) Applicant: GS Yuasa International Ltd., Kyoto-shi (JP)

(72) Inventor: Tomonori Kishimoto, Ritto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 245 days.

(21) Appl. No.: 14/597,026

(22) Filed: Jan. 14, 2015

(65) Prior Publication Data

US 2015/0207125 A1 Jul. 23, 2015

(30) Foreign Application Priority Data

Jan. 17, 2014 (JP) ................................. 2014-007023
Dec. 1, 2014 (JP) ................................. 2014-243468

(51) Int. Cl.
*H01M 2/26* (2006.01)
*H01M 2/18* (2006.01)
*H01G 11/06* (2013.01)
*H01G 11/28* (2013.01)
*H01G 11/56* (2013.01)
*H01G 11/74* (2013.01)
*H01G 11/82* (2013.01)

(52) U.S. Cl.
CPC .............. *H01M 2/18* (2013.01); *H01G 11/06* (2013.01); *H01G 11/28* (2013.01); *H01G 11/56* (2013.01); *H01G 11/74* (2013.01); *H01G 11/82* (2013.01); *H01M 2/263* (2013.01); *H01M 2220/20* (2013.01); *Y02E 60/13* (2013.01); *Y02T 10/7022* (2013.01)

(58) Field of Classification Search
CPC ........ H01M 2/263; H01M 2/26; H01M 2/266; H01G 11/82
See application file for complete search history.

(56) References Cited

U.S. PATENT DOCUMENTS

| 7,790,313 | B2 | 9/2010 | Lee |
| 8,492,022 | B2 | 7/2013 | Kim et al. |
| 8,722,237 | B2 | 5/2014 | Guen |

(Continued)

FOREIGN PATENT DOCUMENTS

| JP | 2006-040901 A | 2/2006 |
| JP | 2011-082162 A | 4/2011 |

(Continued)

*Primary Examiner* — Wojciech Haske
(74) *Attorney, Agent, or Firm* — McGinn I. P. Law Group, PLLC

(57) ABSTRACT

An energy storage device includes: an electrode terminal; an electrode assembly; a current collector configured to electrically connect the electrode terminal to the electrode assembly; and a container configured to store the electrode assembly and the current collector. The current collector includes a terminal connection part connected to the electrode terminal and an electrode assembly-connection part connected to the electrode assembly. The energy storage device further includes a spacer disposed lateral to the electrode assembly-connection part of the current collector. The spacer includes a restriction part configured to contact a part in a longitudinal direction of the electrode assembly-connection part of the current collector to restrict movement of the current collector in the longitudinal direction.

13 Claims, 22 Drawing Sheets

(56) References Cited

U.S. PATENT DOCUMENTS

| | | | |
|---|---|---|---|
| 2011/0104559 A1* | 5/2011 | Kim | H01M 2/021 429/163 |
| 2011/0136004 A1* | 6/2011 | Kwak | H01M 2/024 429/186 |
| 2012/0135283 A1* | 5/2012 | Lee | H01M 2/1061 429/82 |
| 2012/0214050 A1* | 8/2012 | Kim | H01M 2/263 429/179 |
| 2013/0004824 A1 | 1/2013 | Naganawa et al. | |
| 2013/0078505 A1 | 3/2013 | Kim et al. | |
| 2013/0084471 A1 | 4/2013 | Han et al. | |
| 2013/0084488 A1 | 4/2013 | Waki et al. | |
| 2013/0302667 A1 | 11/2013 | Kim et al. | |

FOREIGN PATENT DOCUMENTS

| | | |
|---|---|---|
| JP | 2012-209238 A | 10/2012 |
| JP | 2013-058346 A | 3/2013 |
| JP | 2013-073936 A | 4/2013 |
| JP | 2013-077546 A | 4/2013 |
| JP | 2013-093314 A | 5/2013 |
| JP | 2013-137864 A | 7/2013 |
| JP | 2013-152916 A | 8/2013 |
| JP | 2013-157085 A | 8/2013 |
| JP | 2014-096388 A | 5/2014 |

* cited by examiner

ENERGY STORAGE DEVICE

CROSS-REFERENCE TO RELATED APPLICATIONS

This application claims the benefit of Japanese patent applications No. 2014-007023, filed on Jan. 17, 2014, and No. 2014-243468, filed on Dec. 1, 2014, which are incorporated by reference.

FIELD

The present invention relates to an energy storage device provided with an electrode terminal, an electrode assembly, and a current collector for electrically connecting the electrode terminal to the electrode assembly.

BACKGROUND

To address a global environmental problem, the replacement of gasoline vehicles with electric vehicles has been increasingly important. This promotes the development of electric vehicles (EV), plug-in hybrid electric vehicles (PHEV), and hybrid electric vehicles (HEV) that use an energy storage device such as a lithium ion secondary battery as a driving source. Such energy storage device generally includes an electrode assembly having a positive electrode and a negative electrode, an electrode terminal, and a current collector for electrically connecting the electrode assembly to the electrode terminal.

In a proposed conventional energy storage device, electrode assemblies are held by connecting the electrode assemblies to a current collector, and suspending the electrode assemblies from the current collector (Refer to JP-A-2013-077546, for example). In the energy storage device, the electrode assemblies are held by connecting a plurality of legs suspending from one current collector to the respective electrode assemblies, and suspending the electrode assemblies from the current collector.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The conventional energy storage device in which the electrode assemblies suspend from the current collector is vulnerable to vibration and shock.

That is, because the electrode assemblies suspend from the current collector in the conventional energy storage device, when an excessive load acts on the current collector due to vibration or shock at collision, the current collector can be deformed, or connected sections of the current collector and the electrode assemblies may break.

The present invention is devised to solve the problem, and an object thereof is to provide an energy storage device capable of increasing a vibration resistance or a shock resistance in the configuration in which an electrode assembly suspends from a current collector.

An energy storage device according to an aspect of the present invention includes: an electrode terminal; an electrode assembly; a current collector configured to electrically connect the electrode terminal to the electrode assembly; and a container configured to store the electrode assembly and the current collector, wherein the current collector includes a terminal connection part connected to the electrode terminal and an electrode assembly-connection part connected to the electrode assembly, the energy storage device further includes a spacer disposed lateral to the electrode assembly-connection part of the current collector, and the spacer includes a restriction part configured to contact a part in a longitudinal direction of the electrode assembly-connection part of the current collector to restrict movement of the current collector in the longitudinal direction.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 1:
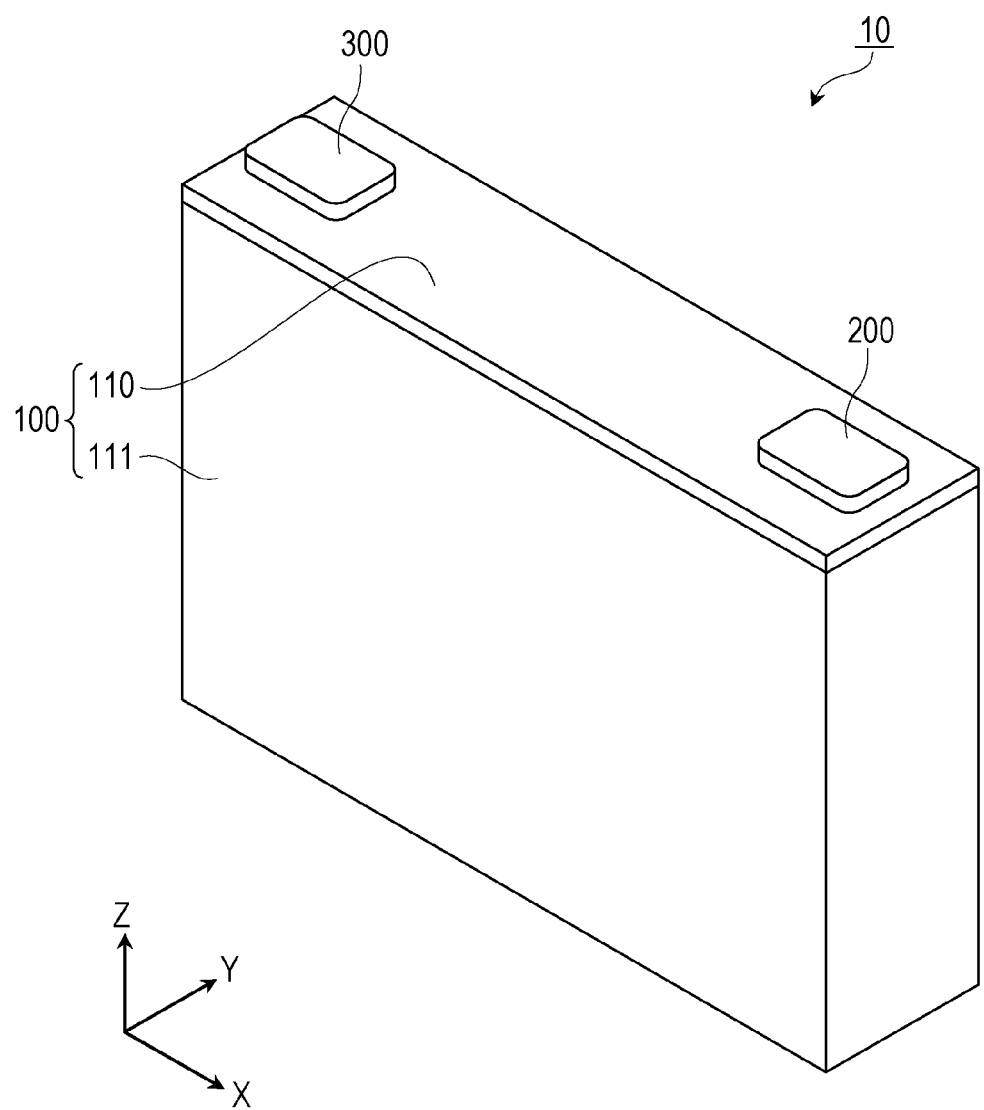
FIG. 1 is a perspective view schematically showing the external appearance of an energy storage device in accordance with an embodiment of the present invention.

A first aspect of the present invention is an energy storage device including: an electrode terminal; an electrode assembly; a current collector configured to electrically connect the electrode terminal to the electrode assembly; and a container configured to store the electrode assembly and the current collector, wherein the current collector includes a terminal connection part connected to the electrode terminal and an electrode assembly-connection part connected to the electrode assembly, the energy storage device further includes a spacer disposed lateral to the electrode assembly-connection part of the current collector, and the spacer includes a restriction part configured to contact a part in a longitudinal direction of the electrode assembly-connection part of the current collector to restrict movement of the current collector in the longitudinal direction.

The energy storage device includes the spacer that contacts a part of the current collector to restrict the movement of the current collector, and the spacer prevents the current collector from swinging due to vibration or shock at collision. Thus, in the energy storage device in which the electrode assembly suspends from the current collector, the spacer can prevent the current collector from swinging, preventing deformation and damage of the current collector to increase the vibration resistance or the shock resistance.

In a second aspect of the present invention, the energy storage device may have a plurality of the electrode assemblies, the restriction part may have a first restriction part that protrudes toward the electrode assemblies and contacts a part of the current collector to restrict movement of the current collector in the longitudinal direction, and the first restriction part may be disposed between the two adjacent electrode assemblies of the plurality of the electrode assemblies.

The first restriction part of the spacer, which serves to restrict the movement of the current collector, protrudes toward the electrode assemblies, thereby reinforcing the spacer. The first restriction part can prevent swinging of the current collector while reinforcing the spacer, preventing deformation and damage to increase the vibration resistance or the shock resistance.

Because the first restriction part of the spacer is disposed between the two adjacent electrode assemblies, the spacer can be positioned with respect to the electrode assemblies.

In a third aspect of the present invention, the current collector may have a plurality of the electrode assembly-connection parts and a coupling part that couples the two adjacent electrode assembly-connection parts to each other, and the first restriction part of the spacer may contact the coupling part of the current collector to restrict movement of the current collector in the longitudinal direction.

The first restriction part of the spacer can contact the coupling part that couples the two adjacent electrode assembly-connection parts of the current collector to each other, restricting the movement of the current collector. Therefore, because the spacer can be readily brought into contact with a part of the current collector, with simple configuration, deformation and damage can be prevented to increase the vibration resistance or the shock resistance.

In a fourth aspect of the present invention, the first restriction part may have a first projection disposed on the electrode assembly side of the coupling part.

The first restriction part has the first projection on the electrode assembly side of the coupling part, restricting the movement of the coupling part toward the electrode assembly. Thus, the first projection prevents the current collector from moving toward the electrode assembly.

In a fifth aspect of the present invention, the restriction part may have a second restriction part that protrudes toward the electrode assembly and contacts a tip of the electrode assembly-connection part of the current collector to restrict movement of the current collector in the longitudinal direction.

The spacer has the second restriction part that protrudes toward the electrode assembly to restrict the movement of the current collector, preventing swinging of the current collector while reinforcing the spacer.

In a sixth aspect of the present invention, the tip of the electrode assembly-connection part may be bent away from the electrode assembly.

The tip of the electrode assembly-connection part of the current collector is bent away from the electrode assembly, readily bringing the tip into contact with the second restriction part of the spacer. This can prevent deformation and damage with simple configuration, achieving a high vibration resistance or shock resistance.

In a seventh aspect of the present invention, the spacer may directly or indirectly contact a bottom face of the container in the longitudinal direction.

One end of the spacer directly or indirectly contacts the bottom face of the container, preventing the spacer from swinging in the container. Restricting the movement of the spacer with respect to the container can also restrict the movement of the current collector with respect to the container, preventing the current collector from swinging in the container.

In an eighth aspect of the present invention, the energy storage device may include the two opposed spacers across the electrode assembly, and the two spacers may be coupled to each other on a bottom face side of the container.

Because the two opposed spacers across the electrode assembly are coupled to each other on the bottom face side of the container, even when external vibration or shock acts on the energy storage device, a high vibration resistance or shock resistance can be achieved.

In a ninth aspect of the present invention, the energy storage device may further include a fixation member fixed to the container, and at least one of the spacer and the fixation member may have a second projection that engages with the other of the spacer and the fixation member to restrict inward movement of the spacer in the container.

The second projection of at least one of the spacer and the fixation member restricts the movement of the spacer toward the inner side of the container. Because the movement of the current collector with respect to the spacer is restricted, restricting the movement of the spacer with respect to the container can also restrict the movement of the current collector with respect to the container. This can prevent swinging of the current collector, preventing deformation and damage to increase the vibration resistance or the shock resistance.

The present invention can be embodied as such energy storage device including the spacer, the current collector, and the fixation member, and also embodied as the spacer, the current collector, or the fixation member.

According to the aspects of the invention, the energy storage device can increase the vibration resistance or the shock resistance in the configuration in which the electrode assembly suspends from the current collector.

An energy storage device in accordance with an embodiment of the present invention will be described below with reference to figures. The following embodiment shows a comprehensive or specific example. Numeric values, shapes, materials, components, and arrangement and connection of the component are merely examples, and do not intend to limit the present invention. The components that are not recited in independent claims indicating the highest concept among the components in the following embodiment will be described as optional components.

In the following description and figures, a winding axis direction of an electrode assembly of an energy storage device is defined as an X-axis direction (hereinafter also referred to as first direction). That is, the X-axis direction (first direction) is defined as an aligning direction of a current collector, side spacers, or an electrode terminal, or a direction in which short side faces of a container are opposed. A vertical direction of the energy storage device is defined as a Z-axis direction (hereinafter also referred to as second direction). That is, the Z-axis direction (second direction) is defined as a direction in which legs (below-mentioned electrode assembly-connection parts) of the current collector extend, or a longitudinal direction of the short side faces of the container. A direction intersecting the X-axis direction and the Z-axis direction is defined as a Y-axis direction. That is, the Y-axis direction is defined as a direction in which long side faces of the container are opposed, a lateral direction of the short side faces of the container, or a thickness direction of the container.

Embodiment

First, configuration of an energy storage device 10 will be described.

Figure 2:
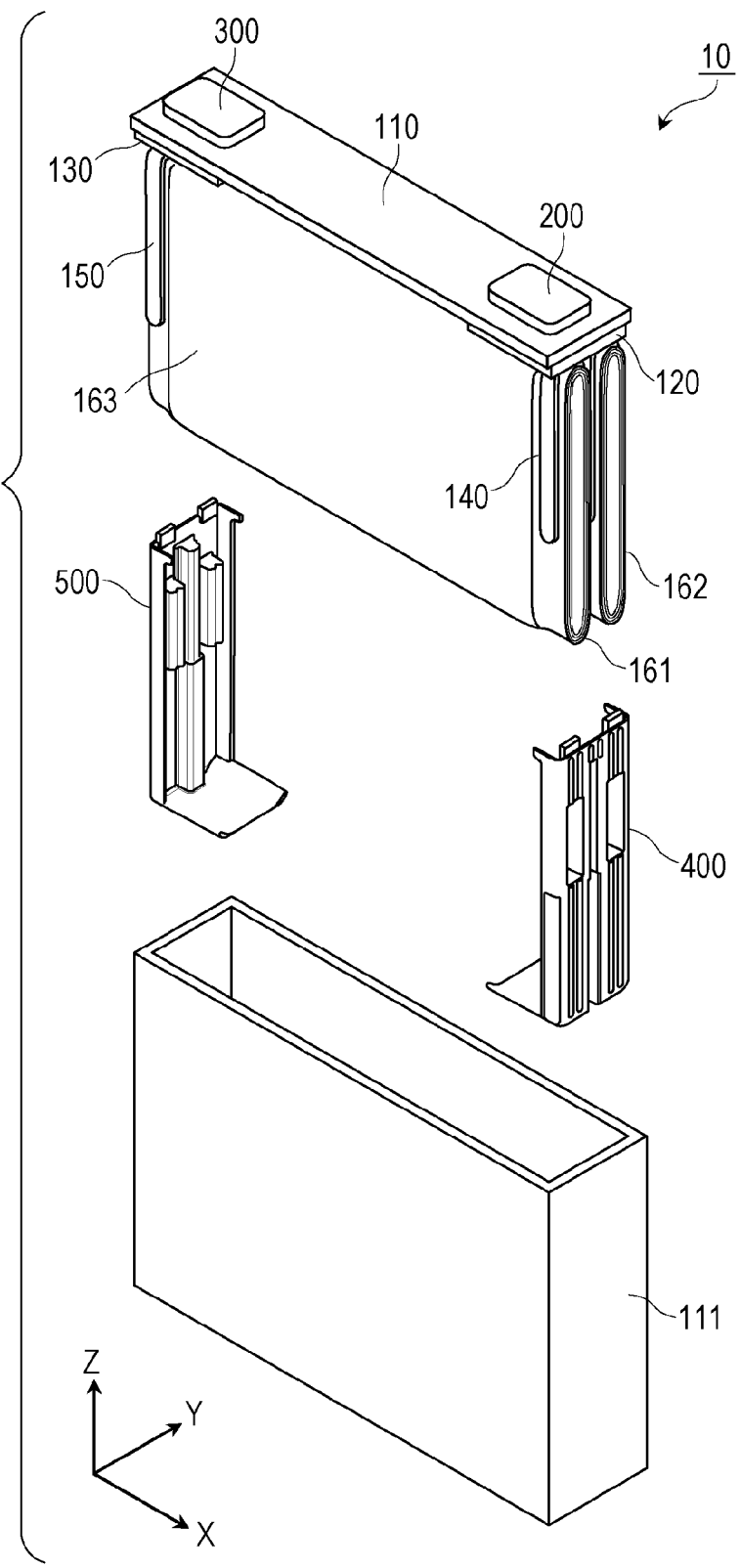
FIG. 2 is an exploded perspective view showing components of the energy storage device.
Figure 3:
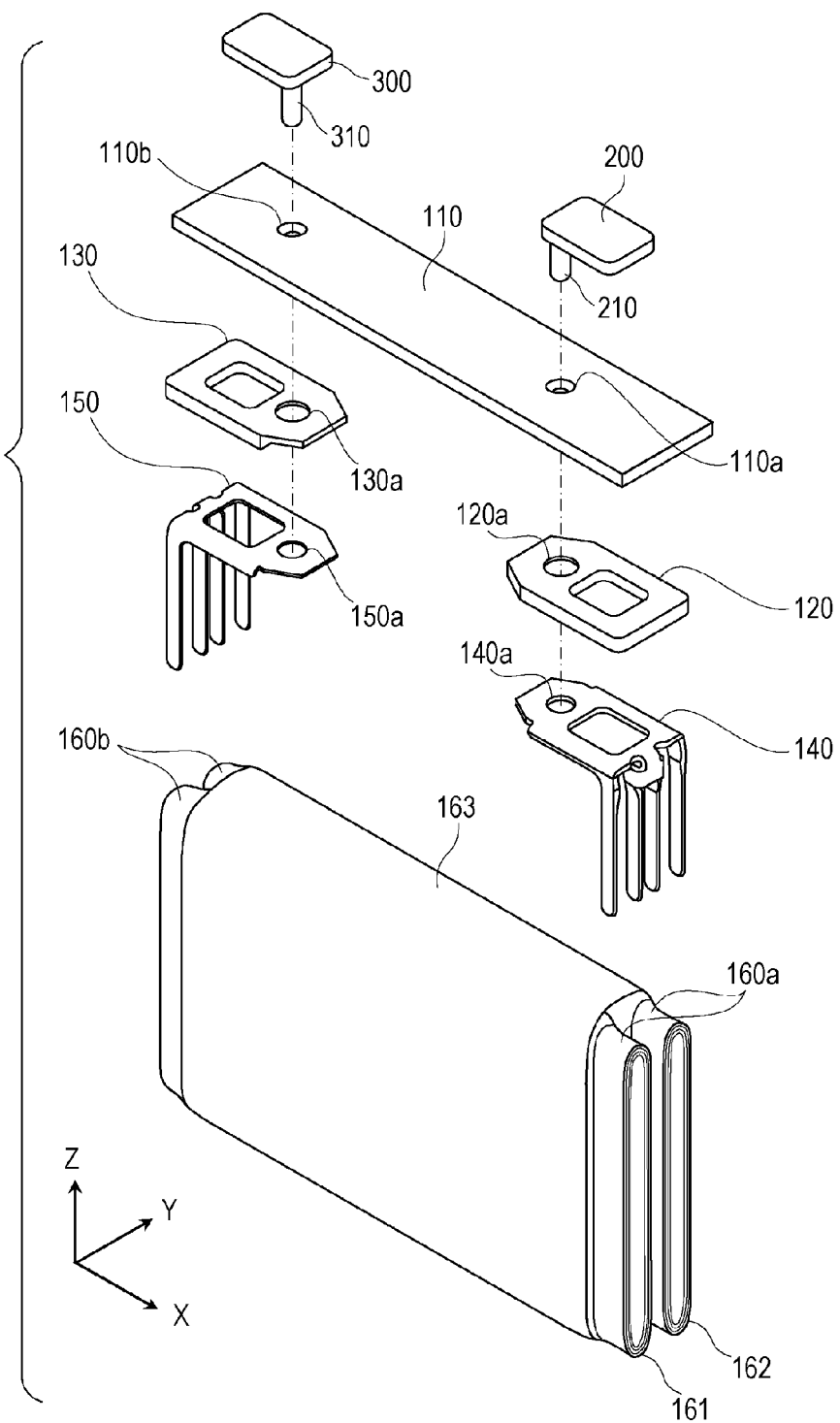
FIG. 3 is an exploded perspective view showing the component of the exploded energy storage device.

FIG. 1 is a perspective view schematically showing the external appearance of the energy storage device 10 in accordance with the embodiment of the present invention. FIG. 2 is an exploded perspective view showing components of the energy storage device 10. FIG. 3 is an exploded perspective view of the components of the exploded energy storage device 10. FIG. 3 does not show the container body 111 of the container 100 and spacers 400 and 500.

The energy storage device 10 is a secondary battery capable of being charged electricity and capable of discharging electricity, and in particular, a nonaqueous electrolyte secondary battery such as a lithium ion secondary battery. The energy storage device 10 is applied to especially, electric vehicles (EV), plug-in hybrid electric vehicles (PHEV), or hybrid electric vehicles (HEV). The energy storage device 10 is not limited to the nonaqueous electrolyte secondary battery, and may be any secondary battery other than the nonaqueous electrolyte secondary battery, or a capacitor.

As shown in these figures, energy storage device 10 includes the container 100, a positive electrode terminal 200, and a negative electrode terminal 300. Insulating members 120 and 130, a positive electrode current collector 140, a negative electrode current collector 150, two electrode assemblies including a first electrode assembly 161 and a second electrode assembly 162, and spacers 400 and 500 are stored in the container 100.

A liquid such as an electrolyte solution (nonaqueous electrolyte solution) not shown is filled in the container 100 of the energy storage device 10. Any type of electrolyte solution that does not impair the capabilities of the energy storage device 10 may be filled in the container 100 without limitation.

The container 100 is configured of the closed-end container body 111 shaped like a rectangular tube and a plate-like lid 110 that closes an opening of the container body 111. The container 100 is sealed by storing the first electrode assembly 161 and the second electrode assembly 162 and then, welding the lid 110 to the container body 111. Though not specifically limited, materials for the lid 110 and the container body 111 are preferably, weldable metal including stainless steel, aluminum, and aluminum alloy.

The first electrode assembly 161 and the second electrode assembly 162 are two power generating elements disposed in parallel, and are electrically connected to the positive electrode current collector 140 and the negative electrode current collector 150. The first electrode assembly 161 and the second electrode assembly 162 have the same configuration.

Specifically, the first electrode assembly 161 and the second electrode assembly 162 each include a positive electrode, a negative electrode, and a separator, and can store electricity. The positive electrode is configured by forming a positive electrode active material layer on a positive electrode substrate layer that is long band-like metal foil made of aluminum, aluminum alloy, or the like. The negative electrode is configured by forming a negative electrode active material layer on a negative electrode substrate layer that is a long band-like metal foil made of copper, copper alloy, or the like. The separator is a microporous sheet made of resin.

Any publicly known positive electrode active material or negative electrode active material that can intercalate and deintercalate lithium ions can be used as the positive electrode active material for the positive electrode active material layer or the negative electrode active material for the negative electrode active material layer.

The first electrode assembly 161 and the second electrode assembly 162 each are formed by winding the positive electrode and the negative electrode into layers with the separator sandwiched therebetween. Although the first electrode assembly 161 and the second electrode assembly 162 are oblong in this figure, they may be circular or elliptical. The first electrode assembly 161 and the second electrode assembly 162 are not limited to wounded-type and may be layered flat plates.

The first electrode assembly 161 and the second electrode assembly 162 each have an end 160a of the positive electrode and an end 160b of the negative electrode. The ends 160a are ends of the electrode assemblies, in which non-active material layer forming parts of the positive electrode are layered and bundled, and the ends 160b are ends of the electrode assemblies, in which non-active material layer forming parts of the negative electrode are layered and bundled. The non-active material layer forming parts of the positive electrode are parts of the positive electrode, where the positive electrode active material is not coated and the positive electrode substrate layer is exposed, and the non-active material layer forming parts of the negative electrode are parts of the negative electrode, where the negative electrode active material is not coated and the negative electrode substrate layer is exposed.

An insulating film 163 is wound around the first electrode assembly 161 and the second electrode assembly 162 to bundle the electrode assemblies. The insulating film 163 is a rectangular sheet-like resin material, and is wound around the first electrode assembly 161 and the second electrode assembly 162 and fastened thereto at a winding end by means of an insulating tape. Any insulating film may be used as the material for the insulating film 163.

As described above, the energy storage device 10 has the plurality of electrode assemblies (two electrode assemblies in this embodiment), which is more preferable than the energy storage device having one electrode assembly in the container 100 of the same volume (capacity) for a following reason. That is, the use of the plurality of electrode assemblies leads a smaller dead space at corners of the container 100 than one electrode assembly to increase the proportion of the electrode assembly in the container, resulting in an increase in the capacity of the energy storage device 10. Especially in the high input/output (high rate) electrode assembly as compared to the high capacity electrode assembly, the amount of the active material on the metal foil needs to be reduced to increase the proportion of the metal foil and the separator in the electrode assembly. For this reason, one electrode assembly has a large number of windings of the electrode, and is hard and less flexible, which is hard to be inserted into the container 100. On the contrary, each of the plurality of electrode assemblies has a small number of windings and thus, is highly flexible.

The positive electrode current collector 140 is a conductive and rigid member that is disposed on the positive electrode side of the first electrode assembly 161 and the second electrode assembly 162, and is electrically connected to the positive electrode terminal 200, and the positive electrodes of the first electrode assembly 161 and the second electrode assembly 162. Like the positive electrode substrate layers of the first electrode assembly 161 and the second electrode assembly 162, the positive electrode current collector 140 is made of aluminum, aluminum alloy, or the like.

Specifically, the positive electrode current collector 140 is welded to the positive electrode side-ends 160a of the first electrode assembly 161 and the second electrode assembly 162, thereby being connected to the positive electrodes of the first electrode assembly 161 and the second electrode assembly 162. The positive electrode current collector 140 has an opening 140a, and a below-mentioned connection part 210 of the positive electrode terminal 200 is inserted into the opening 140a, connecting the positive electrode current collector 140 to the positive electrode terminal 200.

The negative electrode current collector 150 is a conductive and rigid member that is disposed on the negative electrode side of the first electrode assembly 161 and the second electrode assembly 162, and is electrically connected to the negative electrode terminal 300 and the negative electrodes of the first electrode assembly 161 and the second electrode assembly 162. Like the negative electrode substrate layers of the first electrode assembly 161 and the second electrode assembly 162, the negative electrode current collector 150 is made of copper, copper alloy, or the like.

Specifically, the negative electrode current collector 150 is welded to the negative electrode side-ends 160b of the first electrode assembly 161 and the second electrode assembly 162, thereby being connected to the negative electrodes of the first electrode assembly 161 and the second electrode assembly 162. The negative electrode current collector 150 has an opening 150a, and a below-mentioned connection part 310 of the negative electrode terminal 300 is inserted into the opening 150a to connect the negative electrode current collector 150 to the negative electrode terminal 300.

The insulating members 120 and 130 are fixation members fixed to the container 100 when being arranged in the container 100. The fixation member described herein may be any member fixed to the container 100 in the assembled state of the energy storage device 10, and includes members that can be detached from the container 100 at disassembling of the energy storage device 10.

Specifically, the insulating member 120 is a rectangular gasket that is fixed to the lid 110 of the container 100, and is made of insulating resin that isolates the positive electrode current collector 140 from the container 100. The insulating member 120 has an opening 120a into which the below mentioned connection part 210 of the positive electrode terminal 200 is inserted.

Similarly, the insulating member 130 is a rectangular gasket that is fixed to the lid 110 of the container 100, and is made of insulating resin that isolates the negative electrode current collector 150 from the container 100. The insulating member 130 has an opening 130a into which the below mentioned connection part 310 of the negative electrode terminal 300 is inserted.

The positive electrode terminal 200 is an electrode terminal electrically connected to the positive electrode of the first electrode assembly 161 and the positive electrode of the second electrode assembly 162, and the negative electrode terminal 300 is an electrode terminal electrically connected to the negative electrode of the first electrode assembly 161 and the negative electrode of the second electrode assembly 162. That is, the positive electrode terminal 200 and the negative electrode terminal 300 are metal electrode terminals for guiding electricity stored in the first electrode assembly 161 and the second electrode assembly 162 to an external space of the energy storage device 10, and guiding electricity into an internal space of the energy storage device 10 to store electricity in the first electrode assembly 161 and the second electrode assembly 162.

The positive electrode terminal 200 and the negative electrode terminal 300 are attached to the lid 110 disposed above the first electrode assembly 161 and the second electrode assembly 162. Specifically, as shown in FIG. 3, the positive electrode terminal 200 has the connection part 210 that electrically connects the positive electrode terminal 200 to the positive electrode current collector 140.

The connection part 210 is a member, such as a rivet, that is inserted into the opening 140a of the positive electrode current collector 140 and connected to the positive electrode current collector 140. That is, the positive electrode terminal 200, along with the insulating member 120 and the positive electrode current collector 140, is fixed to the lid 110 by inserting the connection part 210 into a through hold 110a of the lid 110, the opening 120a of the insulating member 120, and the opening 140a of the positive electrode current collector 140 and then, swaging the connection part 210.

Similarly, the negative electrode terminal 300 has the connection part 310 that electrically connects the negative electrode terminal 300 to the negative electrode current collector 150. The connection part 310 is a member, such as a rivet, that is inserted into the opening 150a of the negative electrode current collector 150 and connected to the negative electrode current collector 150. That is, the negative electrode terminal 300, along with the insulating member 130 and the negative electrode current collector 150, is fixed to the lid 110 by inserting the connection part 310 into a through hole 110b of the lid 110, the opening 130a of the insulating member 130, and the opening 150a of the negative electrode current collector 150 and then, swaging the connection part 310.

An insulating member not shown such as a gasket is disposed between the positive electrode terminal 200 and the lid 110, and between the negative electrode terminal 300 and the lid 110.

The spacers 400 and 500 are spacers that are disposed lateral to below-mentioned electrode assembly-connection parts of the current collector in the X-axis direction (hereinafter also referred to as first direction), and extend in the longitudinal direction of the electrode assembly-connection parts and in the Z-axis direction intersecting the first direction (hereinafter also referred to as second direction).

Specifically, the spacer 400 is sandwiched between the positive electrode current collector 140 and a side wall of the container 100 on the plus side of the positive electrode current collector 140 in the X-axis direction, and extends along the side wall. The spacer 500 is sandwiched between the negative electrode current collector 150 and a side wall of the container 100 on the minus side of the negative electrode current collector 150 in the X-axis direction, and extends along the side wall.

That is, the spacer 400 and the spacer 500 are disposed between the both ends of the first electrode assembly 161 and the second electrode assembly 162, and the both side walls of the container 100 so as to sandwich the first electrode assembly 161 and the second electrode assembly 162 from both ends in the X-axis direction.

The spacers 400 and 500 are made of an insulating material, for example, polypropylene (PP), polyphenylene sulfide (PPS), polyethylene terephthalate (PET), ceramic, or a composite material thereof. That is, the spacers 400 and 500 isolate the first electrode assembly 161, the second electrode assembly 162, the positive electrode current collector 140, and the negative electrode current collector 150 from the container 100. The spacers 400 and 500 fill the space between the first electrode assembly 161, the second electrode assembly 162, the positive electrode current collector 140, and the negative electrode current collector 150, and the container 100, thereby supporting the first electrode assembly 161, the second electrode assembly 162, the positive electrode current collector 140, and the negative electrode current collector 150 so as not to vibrate with respect to the container 100.

The spacer 400 contacts a part of the positive electrode current collector 140 in the second direction (longitudinal direction of the electrode assembly-connection parts, Z-axis direction) intersecting the first direction (lateral direction of the electrode assembly-connection parts of the current collector, X-axis direction), functioning as a restriction part for restricting the movement of the positive electrode current collector 140 in the second direction. Similarly, the spacer 500 contacts a part of the negative electrode current collector 150 in the second direction (longitudinal direction of the electrode assembly-connection parts, Z-axis direction), functioning as a restriction part for restricting the movement of the negative electrode current collector 150 in the second direction. Details thereof will be described later.

Next, configuration of the positive electrode current collector 140 and the negative electrode current collector 150 will be described in detail. Because the positive electrode current collector 140 and the negative electrode current collector 150 have the same configuration, only the positive electrode current collector 140 will be described, and description of the negative electrode current collector 150 is omitted.

Figure 4:
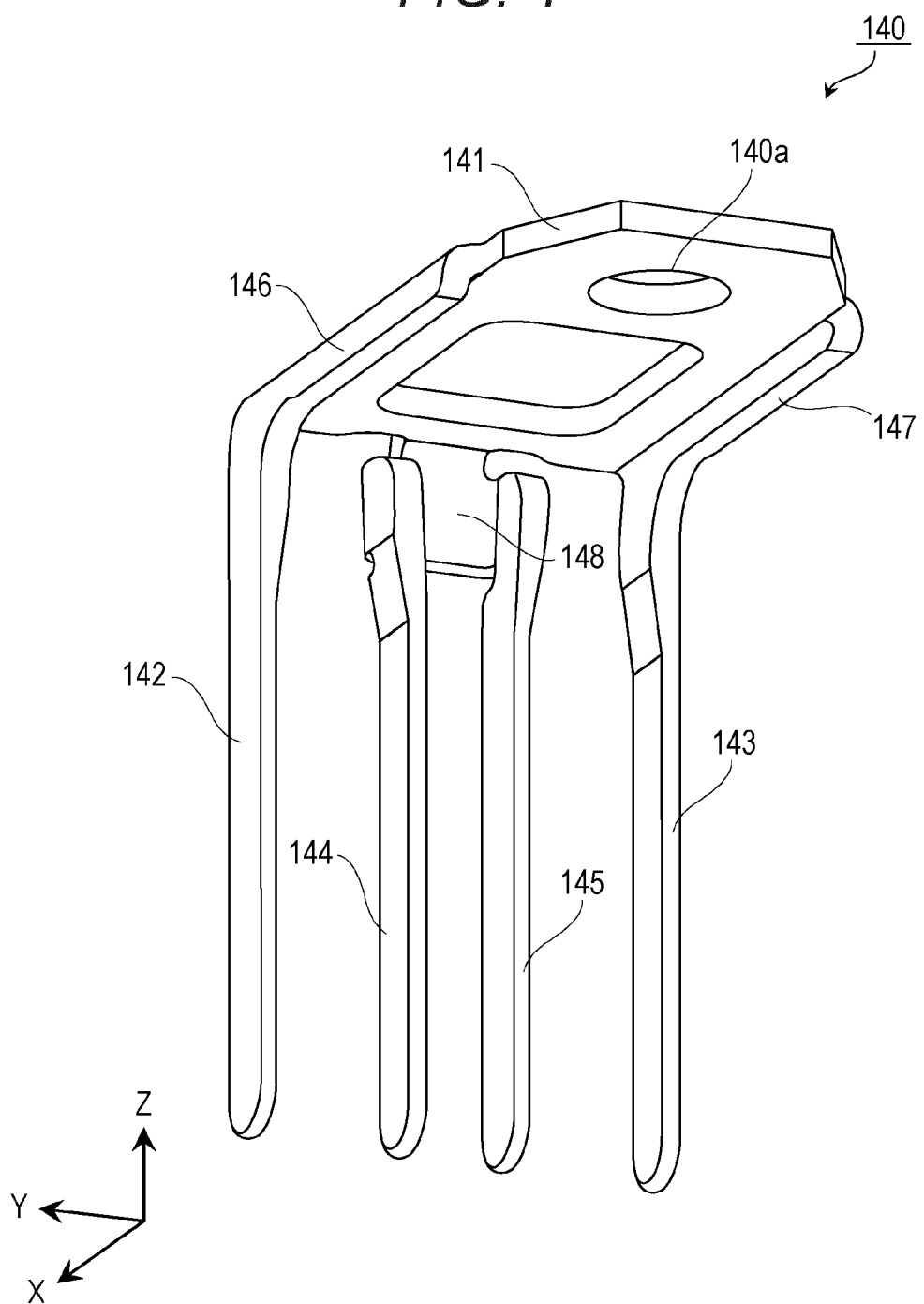
FIG. 4 is a perspective view showing configuration of a positive electrode current collector.
Figure 5:
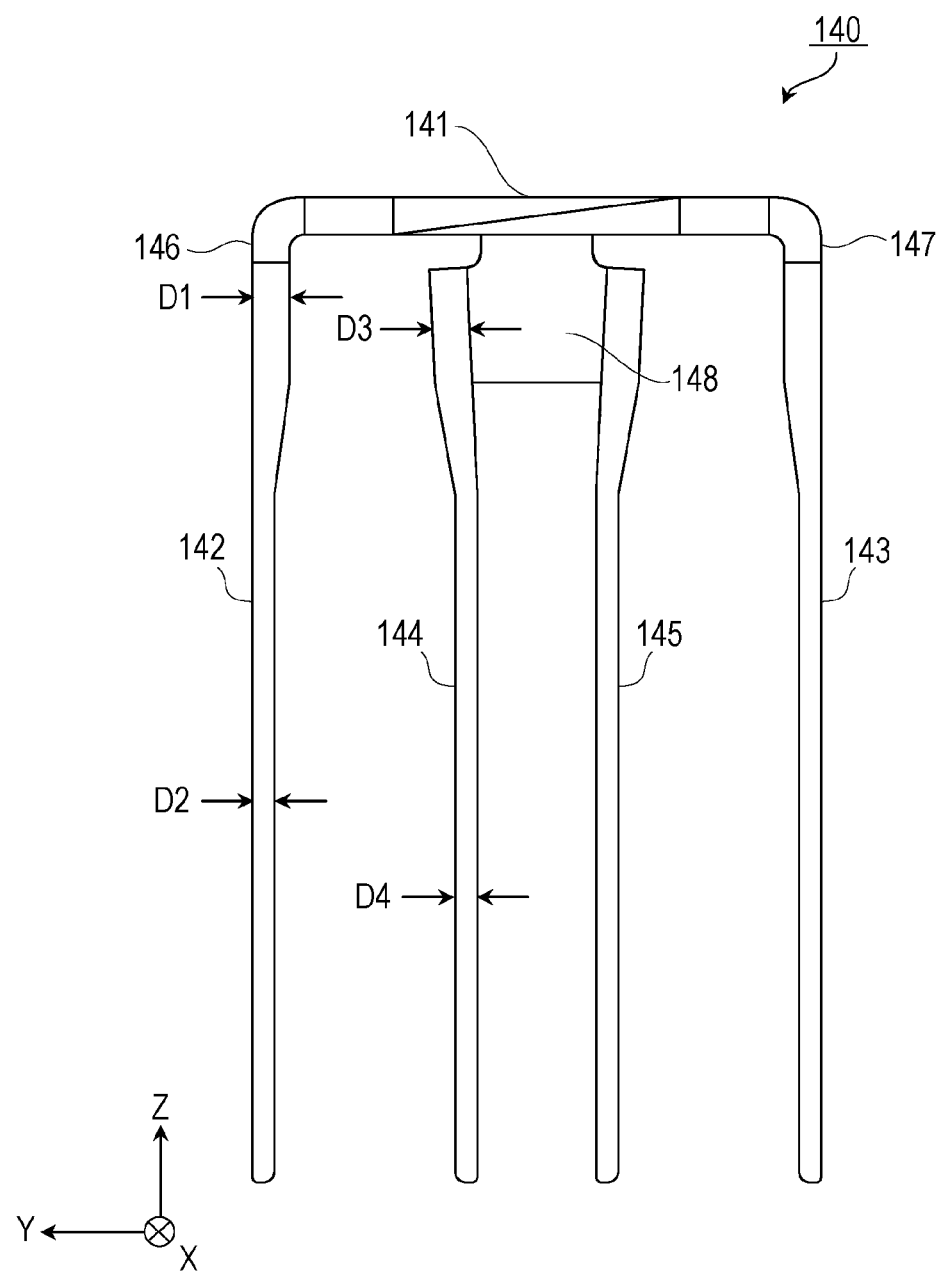
FIG. 5 is a front view showing the positive electrode current collector when viewed from the front.

FIG. 4 is a perspective view showing configuration of the positive electrode current collector 140. Specifically, this figure is a perspective view showing the positive electrode current collector 140 in FIG. 3 when viewed from diagonally below at the back side. FIG. 5 is a front view showing the positive electrode current collector 140 when viewed from the front (minus side in the X-axis direction).

Figure 6:
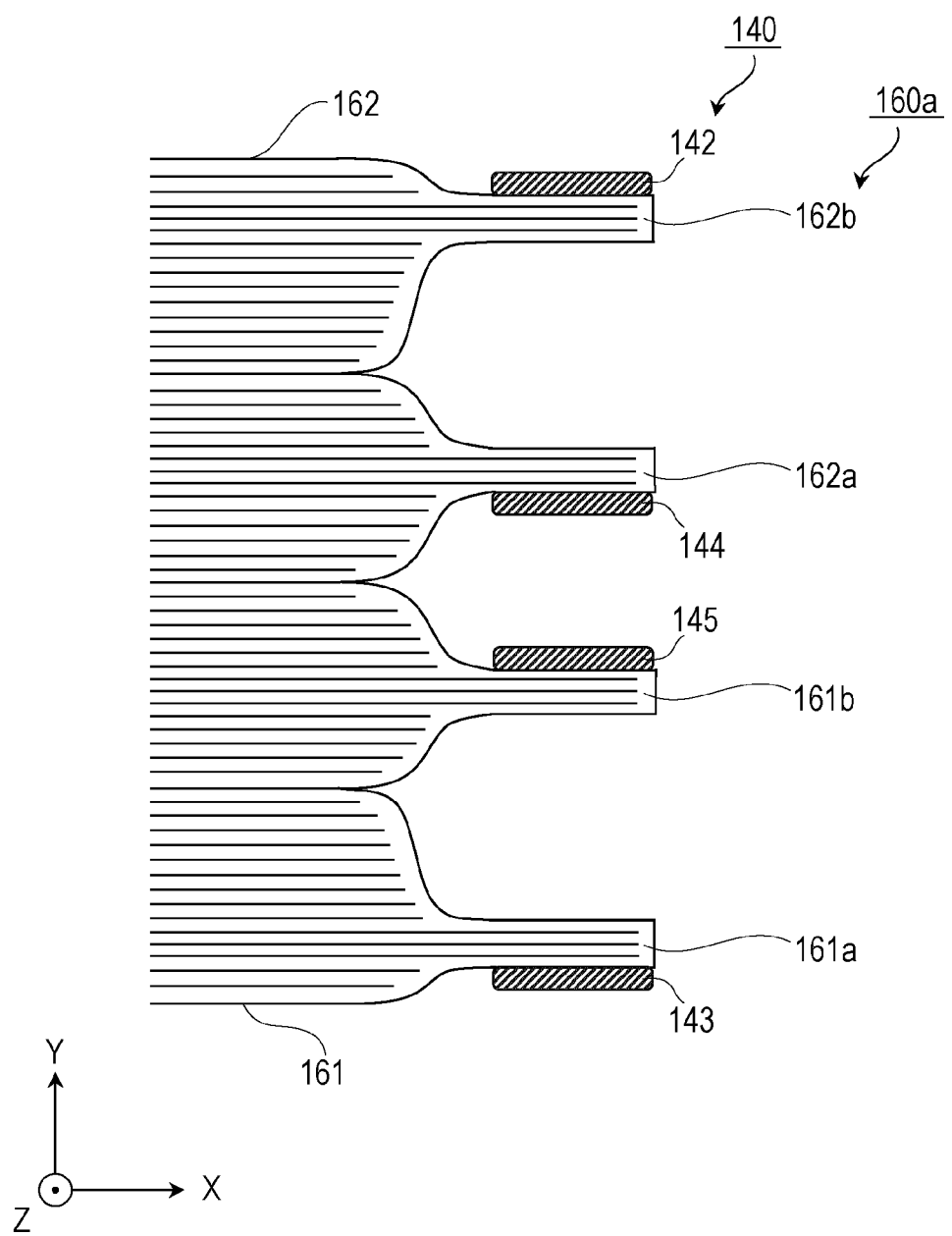
FIG. 6 is a sectional view showing configuration of the positive electrode current collector connected to a first electrode assembly and a second electrode assembly.

FIG. 6 is a sectional view showing configuration of the positive electrode current collector 140 connected to the first electrode assembly 161 and the second electrode assembly 162. Specifically, this figure is a sectional view showing the positive electrode current collector 140 in FIG. 2 connected to the first electrode assembly 161 and the second electrode assembly 162 taken along a plane parallel to an XY plane.

As shown in these figures, the positive electrode current collector 140 has a terminal connection part 141, a plurality of electrode assembly-connection parts (four electrode assembly-connection parts: outer electrode assembly-connection parts 142 and 143 and inner electrode assembly-connection parts 144 and 145 in this embodiment), reinforcement parts 146 and 147, and a coupling part 148.

The terminal connection part 141 is a flat plate-like rectangular part electrically connected to the positive electrode terminal 200. Specifically, the terminal connection part 141 is located on the side of the positive electrode terminal 200 (plus side in the Z-axis direction), and is connected to the positive electrode terminal 200 by inserting the connection part 210 of the positive electrode terminal 200 into the opening 140a.

The opening 140a is a circular through hole formed in the terminal connection part 141, and has a shape conforming to the outer shape of the connection part 210. The shape of the opening 140a is not limited to a circle, and may be ellipse or prism, and preferably, the shape conforming to the outer shape of the connection part 210. The opening 140a is not limited to a through hole, and may be any opening into which the connection part 210 can be inserted, for example, a semicircular or rectangular notch.

The plurality of electrode assembly-connection parts (the outer electrode assembly-connection parts 142 and 143 and the inner electrode assembly-connection parts 144 and 145) are long flat plate-like (rod-like) members that are connected to an end of the terminal connection part 141 and extends from the terminal connection part 141 downward in the substantially vertical direction (Z-axis minus direction). Specifically, the plurality of electrode assembly-connection parts are disposed on the side of the first electrode assembly 161 and the second electrode assembly 162 (minus side in the Z-axis direction), and are connected to the plurality of electrode assemblies.

Here, the outer electrode assembly-connection parts 142 and 143 are electrode assembly-connection parts located on the outer side among the plurality of electrode assembly-connection parts connected to the plurality of electrode assemblies. The inner electrode assembly-connection parts 144 and 145 are electrode assembly-connection parts located on the inner side among the plurality of electrode assembly-connection parts connected to the plurality of electrode assemblies.

Specifically, the outer electrode assembly-connection parts 142 and 143 are outermost electrode assembly-connection parts among the plurality of electrode assembly-connection parts, suspend from side faces (both side faces in the Y-axis direction) of the terminal connection part 141 to the plurality of electrode assemblies, and are connected to the plurality of electrode assemblies. That is, the outer electrode assembly-connection parts 142 and 143 extend in the Z-axis direction, and have opposed faces parallel to an XZ plane, the outer electrode assembly-connection part 142 is connected to the second electrode assembly 162, and the outer electrode assembly-connection part 143 is connected to the first electrode assembly 161.

The outer electrode assembly-connection parts 142 and 143 are formed so as not to reach a bottom face of the container body 111. In this embodiment, the outer electrode assembly-connection parts 142 and 143 are formed up to an almost half of the height of the side face of the container body 111. Although the outer electrode assembly-connection part 142 and the outer electrode assembly-connection part 143 have the same height in this embodiment, they may have different heights.

The inner electrode assembly-connection parts 144 and 145 hang down from the coupling part 148 connected to the center of the rear side face (side face on the plus side in the X-axis direction) of the terminal connection part 141 to the plurality of electrode assemblies, and are connected to the plurality of electrode assemblies. That is, the inner electrode assembly-connection parts 144 and 145 are members extending in the Z-axis direction and have planes parallel to the XZ plane, the inner electrode assembly-connection part 144 is connected to the second electrode assembly 162, and the inner electrode assembly-connection parts 145 is connected to the first electrode assembly 161.

The inner electrode assembly-connection parts 144 and 145 are formed so as not to reach the bottom face of the container body 111. In this embodiment, like the outer electrode assembly-connection parts 142 and 143, the inner electrode assembly-connection parts 144 and 145 are formed up to an almost half of the height of the side face of the container body 111. Although the inner electrode assembly-connection part 144 and the inner electrode assembly-connection parts 145 have the same height in this embodiment, they may have different heights. The inner electrode assembly-connection parts 144 and 145 may have a height that is different from that of the outer electrode assembly-connection parts 142 and 143.

Here, the first electrode assembly 161 and the second electrode assembly 162 are formed by winding the positive electrode and the negative electrode via the separator with a shift from each other in the winding axis (virtual axis parallel to the X-axis direction in this embodiment) direction. The positive electrode and the negative electrode each have a part having no active material layer (non-active material layer forming part) at their ends in the shifting direction.

Specifically, the first electrode assembly 161 has ends 161*a* and 161*b* where the non-active material layer forming parts of the positive electrode are layered at one end in the winding axis direction (the end in the X-axis plus direction). Similarly, the second electrode assembly 162 has ends 162*a* and 162*b* where the non-active material layer forming parts of the positive electrode are layered at one end on the X-axis plus direction. The ends 161*a* and 161*b*, and the ends 162*a* and 162*b* are included in the above-mentioned end 160*a*.

The outer electrode assembly-connection part 142 is connected to the positive electrode side-end 162*b* of the second electrode assembly 162 by welding such as ultrasonic welding or resistance welding. Similarly, the outer electrode assembly-connection part 143 is welded to the positive electrode side-end 161*a* of the first electrode assembly 161 by welding such as ultrasonic welding or resistance welding.

The inner electrode assembly-connection part 144 is connected to the positive electrode side-end 162*a* of the second electrode assembly 162 by welding such as ultrasonic welding or resistance welding. Similarly, the inner electrode assembly-connection part 145 is welded to the positive electrode side-end 161*b* of the first electrode assembly 161 by welding such as ultrasonic welding or resistance welding.

The outer electrode assembly-connection part 143 and the inner electrode assembly-connection part 145 are connected to the first electrode assembly 161, and the outer electrode assembly-connection part 142 and the inner electrode assembly-connection part 144 are connected to the second electrode assembly 162. In this manner, the two electrode assembly-connection parts are connected to the positive electrode or the negative electrode of one of the plurality of electrode assemblies.

At least one electrode assembly-connection part among the plurality of electrode assembly-connection parts is thin at a connected portion between the at least one electrode assembly-connection part and the electrode assembly. In this embodiment, all of the electrode assembly-connection parts are thin at the connected portion between the electrode assembly-connection parts and the electrode assembly.

That is, the outer electrode assembly-connection part 142 has a smaller thickness (D2) of a portion connected to the second electrode assembly 162 than a thickness (D1) of a portion near the terminal connection part 141. Similarly, the outer electrode assembly-connection part 143 has a smaller thickness of a portion connected to the first electrode assembly 161 than a thickness of a portion near the terminal connection part 141.

The inner electrode assembly-connection part 144 has a smaller thickness (D4) of a portion connected to the second electrode assembly 162 than a thickness (D3) of a portion near the terminal connection part 141. Similarly, the inner electrode assembly-connection part 145 has a smaller thickness of a portion connected to the first electrode assembly 161 than a thickness of a portion near the terminal connection part 141.

The reinforcement parts 146 and 147 are parts connected to any electrode assembly-connection part of the plurality of electrode assembly-connection parts and the terminal connection part 141 to reinforce the connection between the electrode assembly-connection part and the terminal connection part 141. The reinforcement parts 146 and 147 are connected to at least one electrode assembly-connection parts of the two electrode assembly-connection parts connected to one electrode assembly and the terminal connection part 141.

That is, the reinforcement parts 146 and 147 are connected to the outer electrode assembly-connection parts 142 and 143 as the outermost electrode assembly-connection parts among the plurality of electrode assembly-connection parts and the terminal connection part 141 to reinforce the connection between the outer electrode assembly-connection parts 142 and 143, and the terminal connection part 141. Specifically, the reinforcement part 146 is connected to the side face (side face on the plus side in the Y-axis direction) of the terminal connection part 141 and the outer electrode assembly-connection part 142, and the reinforcement part 147 is connected to the side face (side face on the minus side in the Y-axis direction) of the terminal connection part 141 and the outer electrode assembly-connection part 143.

In the positive electrode current collector 140, the strength of a connection between one of the two electrode assembly-connection parts connected to one electrode assembly and the terminal connection part 141 is set to be higher than the strength of the connection between the other of the two electrode assembly-connection parts and the terminal connection part 141. That is, the strength of the connection between the outermost electrode assembly-connection part of the plurality of electrode assembly-connection parts and the terminal connection part 141 is set to be higher than the strength of the connection between the other electrode assembly-connection parts and the terminal connection part 141.

Specifically, the reinforcement part 146 is a rib extending from the upper end (end on the plus side in the Z-axis direction) of the outer electrode assembly-connection part 142 along the side face (side face on the plus side in the Y-axis direction) of the terminal connection part 141 in the fore-and-aft direction of the terminal connection part 141 (X-axis direction). The reinforcement part 147 is a rib extending from the upper end (end on the plus side in the Z-axis direction) of the outer electrode assembly-connection parts 143 along the side face (side face on the minus side in the Y-axis direction) of the terminal connection part 141 in the fore-and-aft direction of the terminal connection part 141 (X-axis direction).

The reinforcement parts 146 and 147 are not limited to ribs, and may have any shape that can reinforce the connection between the outer electrode assembly-connection parts 142 and 143, and the terminal connection part 141, for example, flat plate-like shape. Although the reinforcement parts 146 and 147 are made of the same material as that of the other parts, they may be made of any material having a higher strength than the other parts.

The coupling part 148 is a flat plate-like rectangular part that couples the two adjacent electrode assembly-connection parts among the plurality of electrode assembly-connection parts connected to the plurality of electrode assemblies. Specifically, the coupling part 148 couples the inner electrode assembly-connection part 144 to the inner electrode assembly-connection part 145. The coupling part 148 is connected to the rear side face (side face on the plus side in the X-axis direction) of the terminal connection part 141, and also functions to connect the terminal connection part 141 to the inner electrode assembly-connection parts 144 and 145.

The coupling part 148 is disposed between the two adjacent electrode assemblies among the plurality of electrode assemblies. That is, the coupling part 148 is disposed between the first electrode assembly 161 and the second electrode assembly 162. The coupling part 148 contacts the spacer 400 to restrict the movement of the positive electrode current collector 140. Details thereof will be described later.

In the positive electrode current collector 140, the terminal connection part 141, the outer electrode assembly-connection parts 142 and 143, the inner electrode assembly-connection parts 144 and 145, the reinforcement parts 146 and 147, and the coupling part 148 are formed by bending and/or drawing one metal plate. That is, each of the electrode assembly-connection parts is formed by bending the terminal connection part 141 without twisting.

Next, configuration of the insulating members 120 and 130 will be described in detail. Because the insulating member 120 and the insulating member 130 have the same configuration, only the insulating member 120 will be described below, and description of the insulating member 130 is omitted.

Figure 7:
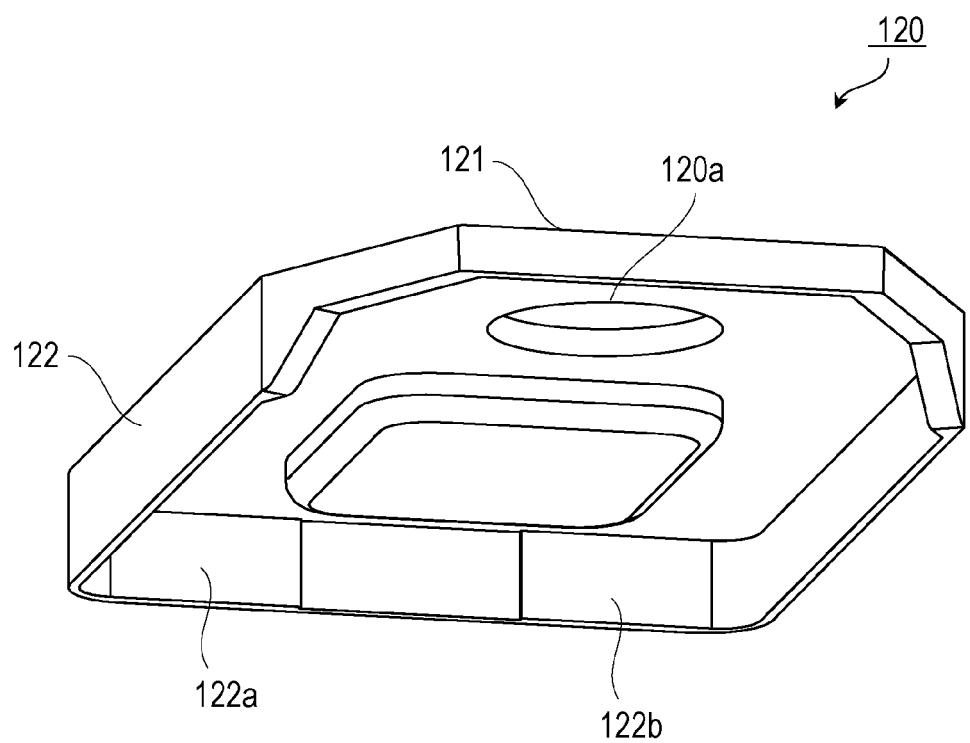
FIG. 7 is a perspective view showing configuration of an insulating member.

FIG. 7 is a perspective view showing configuration of the insulating member 120. Specifically, this figure is a perspective view showing the insulating member 120 in FIG. 3 when viewed from diagonally below at the back side.

As shown in this figure, the insulating member 120 includes an insulating member body 121 and an insulating member wall 122. The insulating member body 121 is a body of the insulating member, and is a flat plate-like rectangular part disposed between the positive electrode current collector 140 and the lid 110 of the container 100 to isolate the positive electrode current collector 140 from the container 100. The insulating member body 121 has the opening 120a into which the connection part 210 of the positive electrode terminal 200 is inserted.

The opening 120a is a circular through hole, and has a shape conforming to the outer shape of the connection part 210. The shape of the opening 120a is not limited to a circle, and may be ellipse or prism, and preferably, the shape conforming to the outer shape of the connection part 210. The opening 120a is not limited to a through hole, and may be any opening into which the connection part 210 can be inserted, for example, a semicircular or rectangular notch.

The insulating member wall 122 is a wall projected downward (in the Z-axis minus direction) from the outer edge of the insulating member body 121, and is a flat plate-like member annularly formed so as to surround the outer edge of the insulating member body 121. The insulating member wall 122 has engagement parts 122a and 122b that engage with below-mentioned second projections 411 and 412 of the spacer 400, respectively.

The engagement parts 122a and 122b are flat plate-like parts, and engage with the second projections 411 and 412 of the spacer 400, respectively, to restrict the movement of the spacer 400 to the inner side of the container 100. The engagement parts 122a and 122b may be parts (projection) projected downward (in the Z-axis minus direction) from the outer edge of the insulating member body 121. Details thereof will be described later.

Next, configuration of the spacers 400 and 500 will be described in detail. Because the spacer 400 and the spacer 500 have the same configuration, only the spacer 400 will be described, and description of the spacer 500 is omitted.

Figure 8:
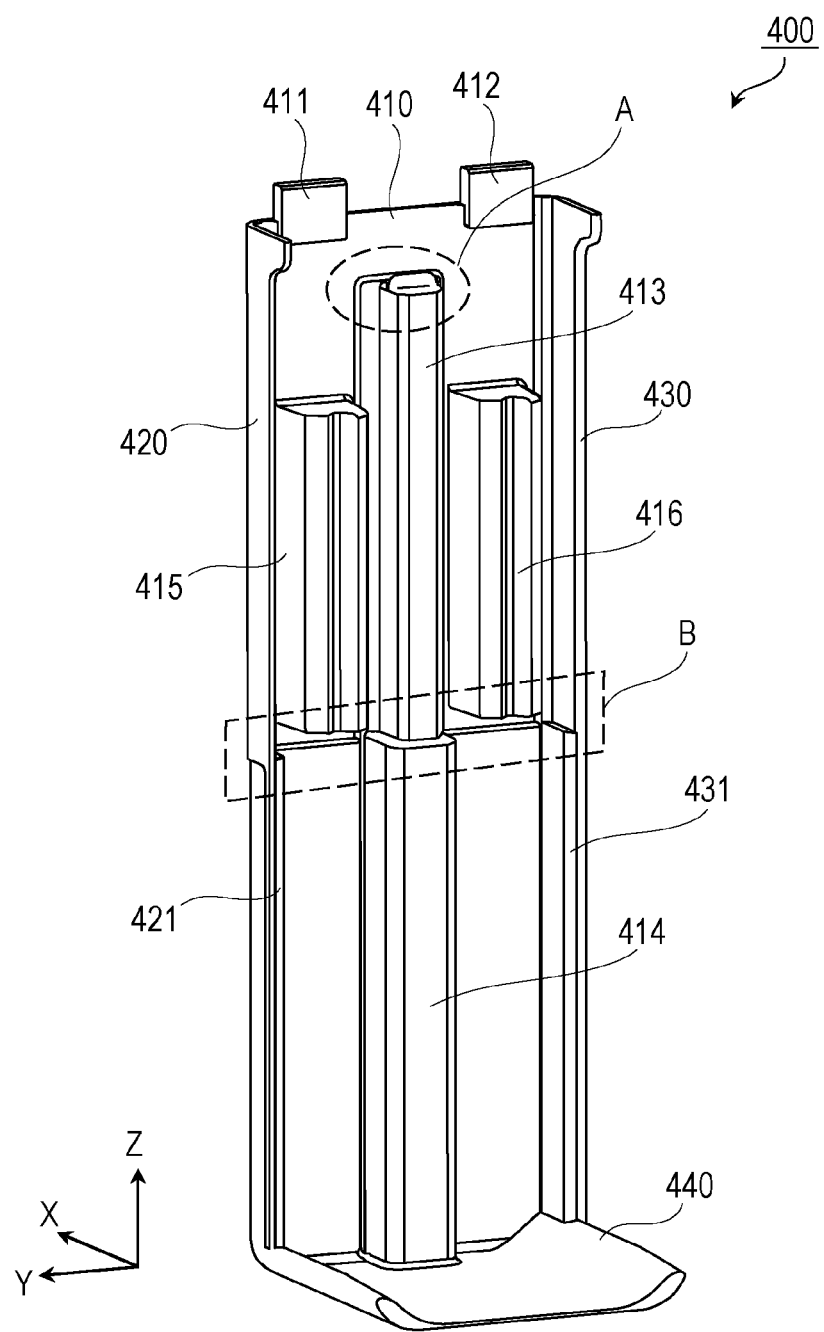
FIG. 8 is a perspective view showing configuration of a spacer.

FIG. 8 is a perspective view showing configuration of the spacer 400. Specifically, this figure is a perspective view showing the spacer 400 in FIG. 3 when viewed from diagonally above at the back side.

Figure 9A:
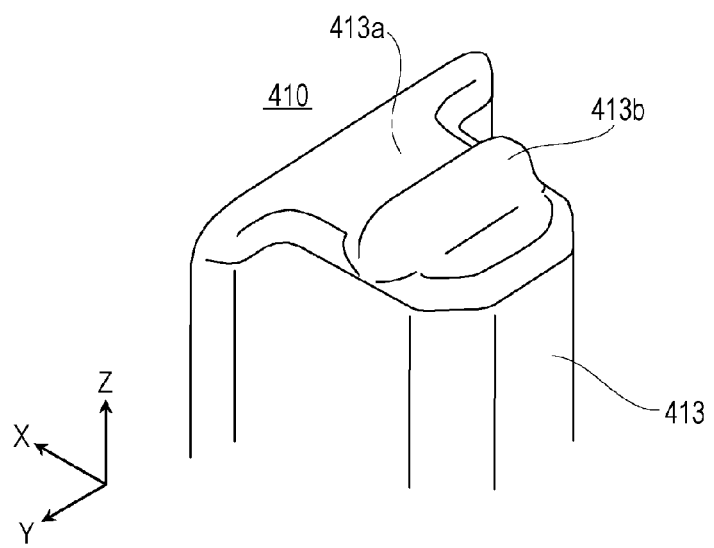
FIG. 9A is an enlarged perspective view showing configuration of a first restriction part of the spacer.
Figure 9B:
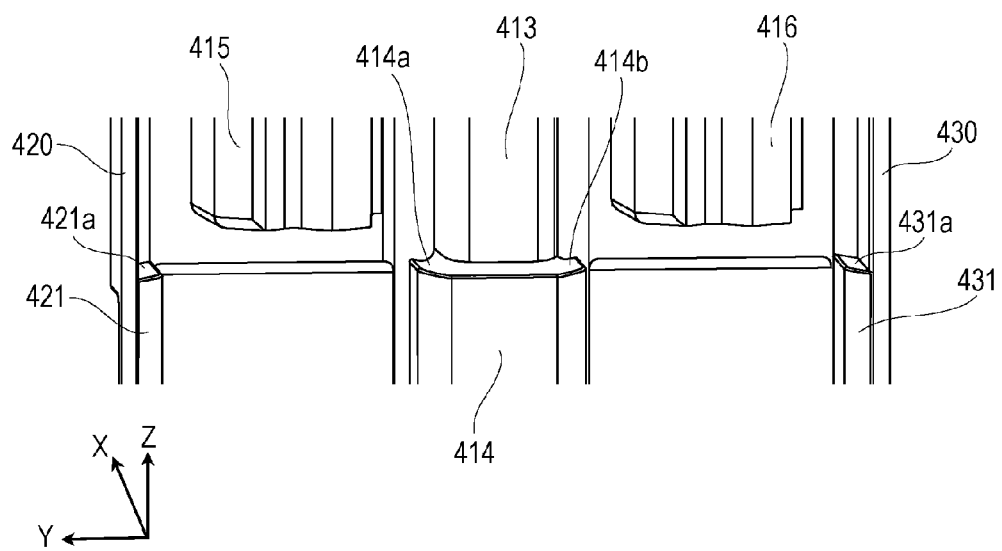
FIG. 9B is an enlarged perspective view showing configuration of a second restriction part of the spacer.

FIG. 9A is an enlarged perspective view showing configuration of a first restriction part 413 of the spacer 400 in accordance with the embodiment of the present invention. FIG. 9B is an enlarged perspective view showing configuration of an inner restriction part 414 and outer restriction parts 421 and 431 as second restriction parts of the spacer 400 in accordance with the embodiment of the present invention. Specifically, FIG. 9A is an enlarged view showing a portion A of the spacer 400 in FIG. 8, and FIG. 9B is an enlarged view showing a portion B of the spacer 400 in FIG. 8.

The inner restriction part 414 and the outer restriction parts 421 and 431 are included in "second restriction part"

in Claims, and the first restriction part 413 and the second restriction parts (the inner restriction part 414 and the outer restriction parts 421 and 431) are included in "restriction part" in Claims.

As shown in these figures, the spacer 400 includes a spacer body 410, spacer side walls 420 and 430, and a spacer bottom face 440. The spacer body 410 is a body of the spacer 400, and includes the second projections 411 and 412, the first restriction part 413, the inner restriction part 414 as the second restriction part, and restriction part-adjacent parts 415 and 416.

The second projections 411 and 412 are flat plate-like rectangular parts that are disposed at the upper end (end on the plus side in the Z-axis direction) of the spacer body 410, and project upward (Z-axis plus direction). The second projections 411 and 412 engage with the insulating member 120 to position of the spacer 400 with respect to the insulating member 120 as well as to restrict the movement of the spacer 400 in the first direction (X-axis direction). Details thereof will be described later.

The first restriction part 413 is a long part (restriction part) that is disposed at the center of an upper portion (portion on the plus side in the Z-axis direction) of the spacer body 410, projects forward (minus side in the X-axis direction), and extends in the vertical direction (Z-axis direction). That is, the first restriction part 413 is disposed between the two adjacent electrode assembly among the plurality of electrode assemblies (between the first electrode assembly 161 and the second electrode assembly 162, which are two electrode assemblies, in this embodiment) and projects toward the first electrode assembly 161 and the second electrode assembly 162.

In this manner, the first restriction part 413 reinforces the spacer 400. The first restriction part 413 engages with the positive electrode current collector 140 to restrict the movement of the positive electrode current collector 140 in the first direction (X-axis direction) as the lateral direction of the electrode assembly-connection part of the positive electrode current collector 140, and in the second direction (Z-axis direction) as the longitudinal direction of the electrode assembly-connection part of the positive electrode current collector 140.

Specifically, the first restriction part 413 has, as shown in FIG. 9A, a first upper face 413a and a first projection 413b. The first upper face 413a is a flat upper plane (plus side in the Z-axis direction) of the first restriction part 413, and is disposed below the coupling part 148 of the positive electrode current collector 140. The first projection 413b is a rib that protrudes upward (to the plus side in the Z-axis direction) from the first upper face 413a, and extends in the Y-axis direction, and protrudes lateral to the positive electrode current collector 140.

The first upper face 413a engages with the positive electrode current collector 140 to restrict the movement of the positive electrode current collector 140 in the second direction, and the first projection 413b engages with the positive electrode current collector 140 to restrict the movement of the positive electrode current collector 140 in the first direction. Details thereof will be described later.

The inner restriction part 414 is a long part (restriction part) that is disposed at the center of the lower portion (portion on the minus side in the Z-axis direction) of the spacer body 410, projects forward (to the minus side in the X-axis direction), and extends in the vertical direction (Z-axis direction). That is, the inner restriction part 414 is disposed between the first electrode assembly 161 and the second electrode assembly 162, which are two electrode assemblies, and protrudes toward the first electrode assembly 161 and the second electrode assembly 162. Thereby, the inner restriction part 414 reinforces the spacer 400.

Specifically, as shown in FIG. 9B, the inner restriction part 414 protrudes forward (to the minus side in the X-axis direction) and sideward (Y-axis direction) further than the first restriction part 413, and has second upper faces 414a and 414b. That is, the second upper faces 414a and 414b are an upper flat plane (plus side in the Z-axis direction) of the inner restriction part 414 formed by protruding the inner restriction part 414 sideward (Y-axis direction) further than the first restriction part 413, and is disposed below the inner electrode assembly-connection parts 144 and 145 of the positive electrode current collector 140 to constitute a planer part.

The second upper faces 414a and 414b of the inner restriction part 414 engage with the positive electrode current collector 140 to restrict the movement of the positive electrode current collector 140 in the second direction (Z-axis direction). Details thereof will be described below. The inner restriction part 414 serves to support the first restriction part 413 from below and reinforce the first restriction part 413.

The restriction part-adjacent parts 415 and 416 are long parts that are disposed on both sides (both sides in the Y-axis direction) of the first restriction part 413 on the upper portion (on the plus side in the Z-axis direction) of the spacer body 410, protrude forward (to the minus side in the X-axis direction), and extends in the vertical direction (Z-axis direction). The restriction part-adjacent parts 415 and 416 function to reinforce the spacer 400, and position the spacer 400 with respect to the first electrode assembly 161 and the second electrode assembly 162. Details thereof will be described later.

The spacer side walls 420 and 430 are parts protruding forward (to the minus side in the X-axis direction) from both side faces of the spacer body 410. Specifically, the spacer side walls 420 and 430 are long flat plate-like parts that extend along the both side faces of the spacer body 410 in the Z-axis direction, and have the outer restriction parts 421 and 431, respectively, as second restriction parts of the spacer 400.

The outer restriction parts 421 and 431 are long parts (restriction parts) that are disposed on the lower portion (on the minus side in the Z-axis direction) of the spacer side walls 420 and 430, protrude forward (to the minus side in the X-axis direction), and extend in the vertical direction (Z-axis direction). That is, the outer restriction parts 421 and 431 are disposed on both sides of the first electrode assembly 161 and the second electrode assembly 162 that are two electrode assemblies, and protrude toward the first electrode assembly 161 and the second electrode assembly 162. Thereby, the outer restriction parts 421 and 431 reinforce the spacer 400.

Specifically, the outer restriction parts 421 and 431, as shown in FIG. 9B, protrude toward the inner side of the spacer body 410, the outer restriction part 421 has a third upper face 421a, and the outer restriction part 431 has a third upper face 431a. That is, third upper faces 421a and 431a are flat upper faces of the outer restriction parts 421 and 431 (plus side in the Z-axis direction) formed by protruding the outer restriction parts 421 and 431 in opposed directions (the third upper face 421a protrudes to the minus side in the Y-axis direction, and the third upper face 431a protrudes to the plus side in the Y-axis direction), and are disposed below the positive electrode current collector 140 to constitute a planer part.

The third upper faces 421*a* and 431*a* of the outer restriction parts 421 and 431 engage with the positive electrode current collector 140 to restrict the movement of the positive electrode current collector 140 in the second direction (Z-axis direction). Details thereof will be described later.

The third upper faces 421*a* and 431*a* are inclined faces formed to become higher toward the inner side of the spacer body 410. That is, the third upper face 421*a* is formed to become higher toward the minus side in the Y-axis direction, and the third upper face 431*a* is formed to become higher toward the plus side in the Y-axis direction. This can restrict the movement of the positive electrode current collector 140 in the Y-axis direction.

The spacer bottom face 440 is a flat plate-like rectangular part protruding forward from the bottom of the spacer body 410, and is mounted on the bottom face of the container 100. Specifically, the spacer bottom face 440 is disposed between the bottom of the first electrode assembly 161 and the second electrode assembly 162, and the bottom face of the container 100 to fill a gap between the bottom of the first electrode assembly 161 and the second electrode assembly 162, and the bottom face of the container 100.

That is, the lower face of the spacer bottom face 440 directly or indirectly contacts the bottom face of the container 100 and is sandwiched between the bottom of the first electrode assembly 161 and the second electrode assembly 162, and the bottom face of the container 100, fixing the spacer 400 to the container 100.

In this manner, the spacer 400 directly or indirectly contacts the bottom face of the container 100 in the second direction (the longitudinal direction of the electrode assembly-connection parts of the positive electrode current collector 140). The direct or indirect contact includes both cases where the lower face of the spacer bottom face 440 directly contacts the bottom face of the container 100 and where another member such as a bottom spacer is sandwiched between the lower surface of the spacer bottom face 440 and the bottom face of the container 100.

The spacer 400 may have no spacer bottom face 440. That is, the spacer 400 does not need have the spacer bottom face 440 that fills the gap between the bottom of the electrode assembly and the bottom face of the container 100 as long as the spacer 400 directly or indirectly contacts the bottom face of the container 100.

Next, relation among the insulating members 120 and 130, the positive electrode current collector 140, the negative electrode current collector 150, and the spacers 400 and 500 will be described in detail. Because the insulating member 120, the positive electrode current collector 140, and the spacer 400 have the same configuration as the insulating member 130, the negative electrode current collector 150, and the spacer 500, only the relation among the insulating member 120, the positive electrode current collector 140, and the spacer 400 will be described below, and description of the insulating member 130, the negative electrode current collector 150, and the spacer 500 is omitted.

Figure 10:
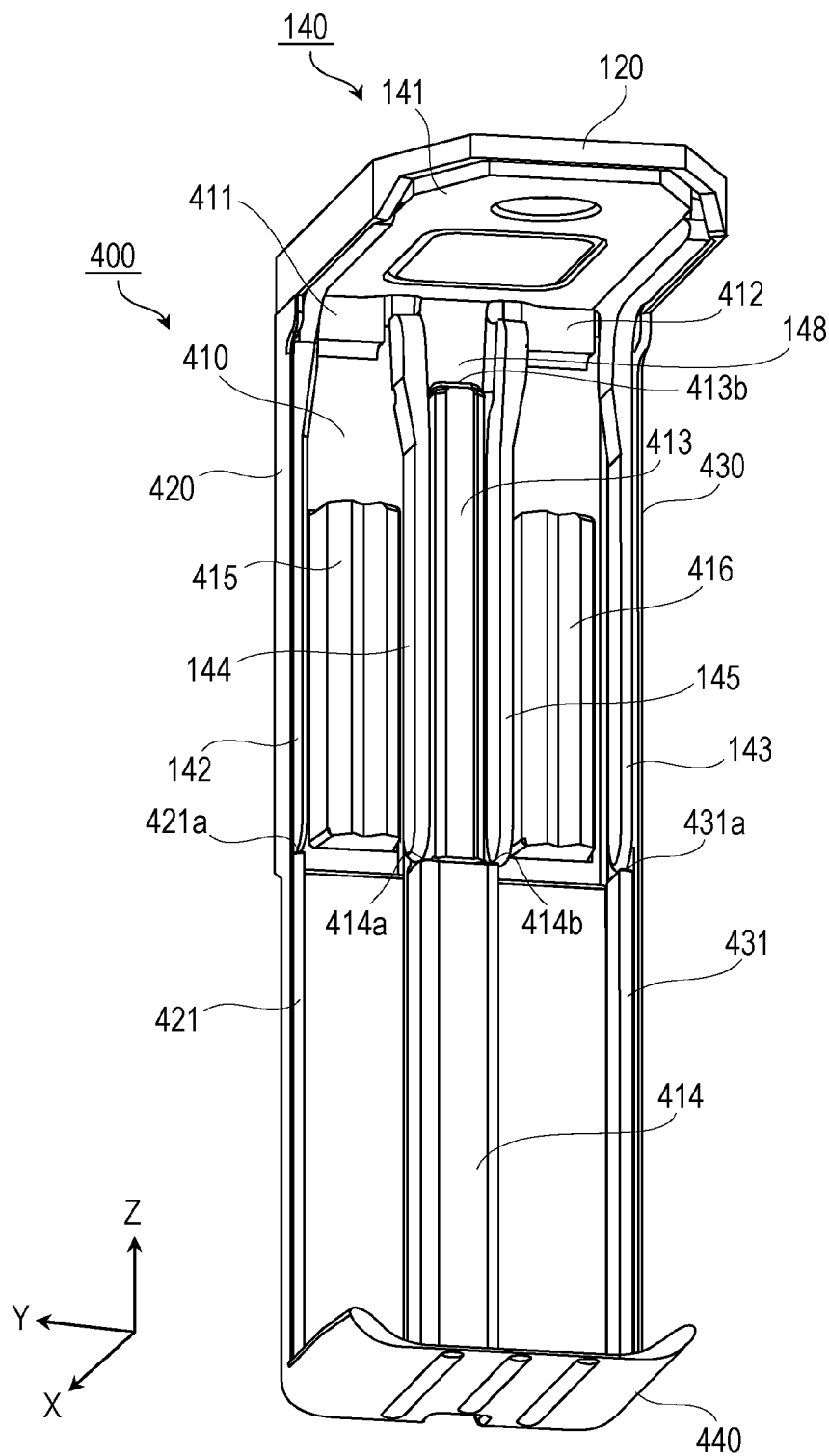
FIG. 10 is a perspective view showing configuration of the insulating member, the positive electrode current collector, and the spacer.

FIG. 10 is a perspective view showing configuration of the insulating member 120, the positive electrode current collector 140, and the spacer 400 in accordance with the embodiment of the present invention.

Figure 11A:
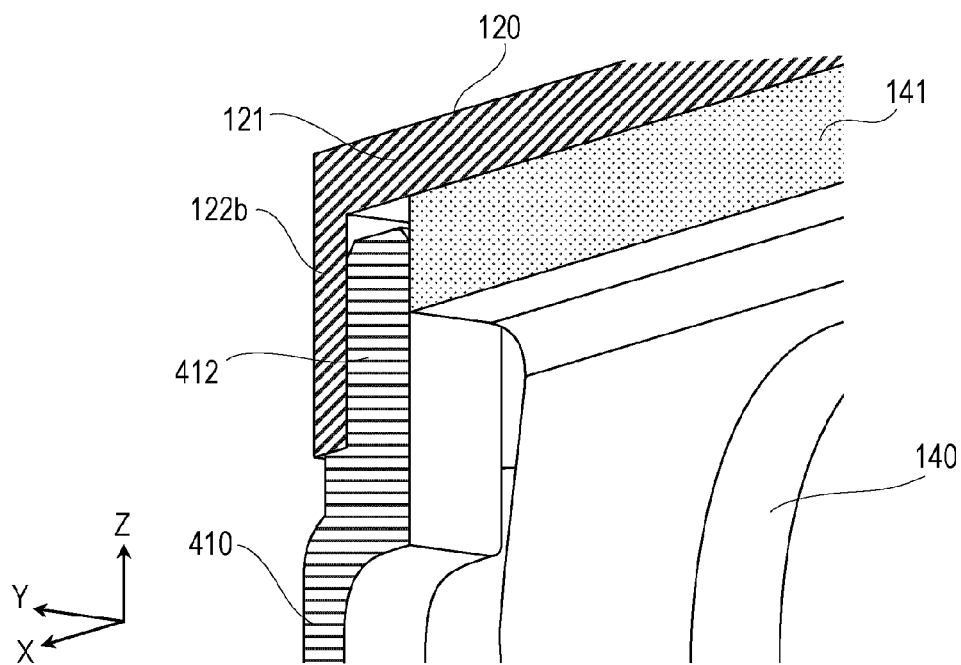
FIG. 11A is an enlarged sectional view showing arrangement of a second projection of the spacer, an engagement part of the insulating member, and the positive electrode current collector.

FIG. 11A is an enlarged sectional view showing arrangement of the second projection 412 of the spacer 400, the engagement part 122*b* of the insulating member 120, and the positive electrode current collector 140 in accordance with the embodiment of the present invention. Specifically, this figure is an enlarged sectional view showing the configuration around the second projection 412 of the spacer 400 in FIG. 10 taken along a plane parallel to the XZ plane.

Figure 11B:
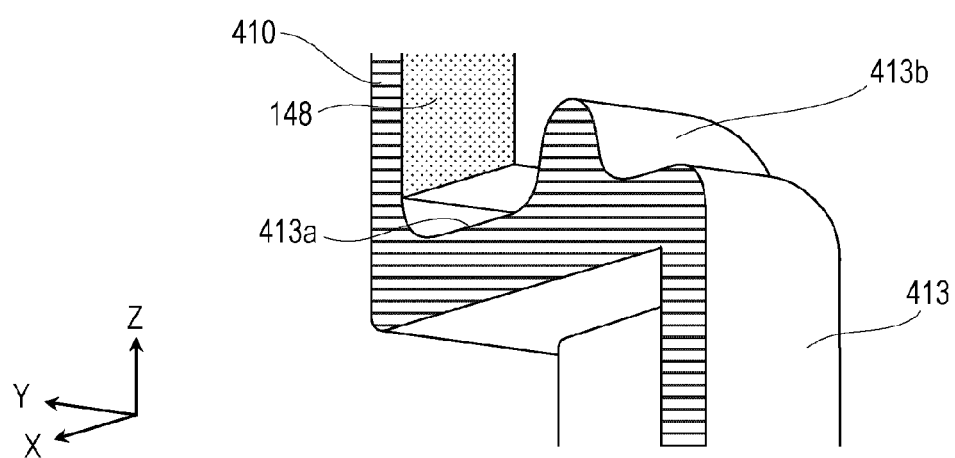
FIG. 11B is an enlarged sectional view showing arrangement of a first restriction part of the spacer and a coupling part of the positive electrode current collector.

FIG. 11B is an enlarged sectional view showing arrangement of the first restriction part 413 of the spacer 400 and the coupling part 148 of the positive electrode current collector 140 in accordance with the embodiment of the present invention. Specifically, this figure is an enlarged sectional view showing configuration around the first projection 413*b* of the first restriction part 413 of the spacer 400 in FIG. 10 taken along a plane parallel to the XZ plane.

Figure 12:
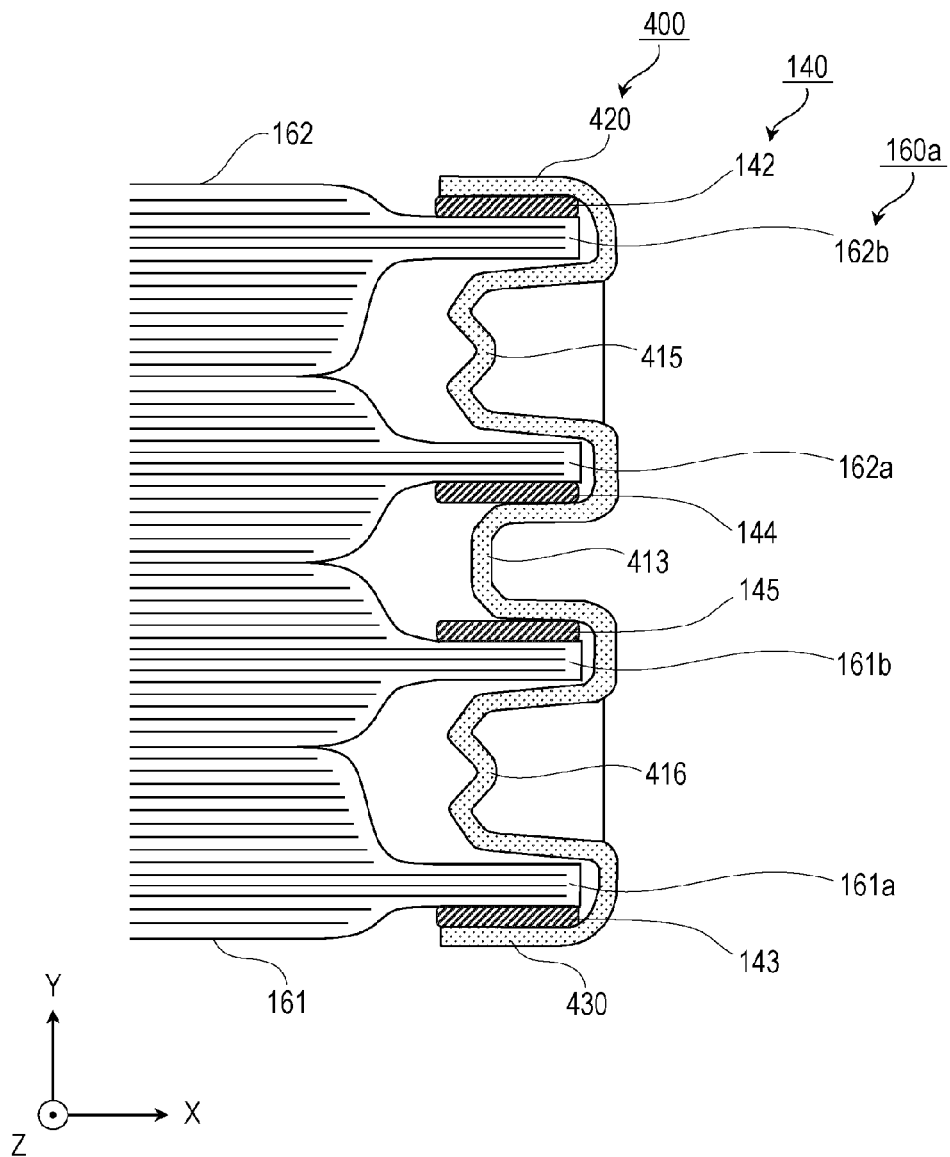
FIG. 12 is a sectional view showing configuration in which the spacer is arranged on the first electrode assembly, the second electrode assembly, and the positive electrode current collector.

FIG. 12 is a sectional view showing configuration in which the spacer 400 is arranged on the first electrode assembly 161, the second electrode assembly 162, and the positive electrode current collector 140 in accordance with the embodiment of the present invention. Specifically, this figure is a sectional view showing the state in which the spacer 400 in FIG. 10 is arranged on the first electrode assembly 161, the second electrode assembly 162, and the positive electrode current collector 140 taken along a plane parallel to the XY plane.

First, as shown in FIG. 10 and FIG. 11A, the spacer 400 detachably (separably) engages with the insulating member 120. That is, the second projection 412 of the spacer 400 is detachably disposed between the engagement part 122*b* of the insulating member 120 and the terminal connection part 141 of the positive electrode current collector 140. Specifically, side faces intersecting the first direction (side faces parallel to the second direction) of the second projection 412, the engagement part 122*b* and the terminal connection part 141 detachably contact each other.

That is, when the insulating member body 121 of the insulating member 120 is arranged above the terminal connection part 141, a gap is formed between the engagement part 122*b* and the terminal connection part 141. The second projection 412 is inserted into the gap between the engagement part 122*b* and the terminal connection part 141, thereby being sandwiched between the engagement part 122*b* and the terminal connection part 141.

Thereby, the second projection 412 engages with the insulating member 120 and the positive electrode current collector 140 to restrict the movement of the spacer 400 in the first direction (X-axis direction). Similarly, the second projection 411 is disposed between the engagement part 122*a* of the insulating member 120 and the terminal connection part 141 of the positive electrode current collector 140, and engages with the insulating member 120 and the positive electrode current collector 140 to restrict the movement of the spacer 400 in the first direction (X-axis direction).

Although both the spacer 400 and the insulating member 120 have the projections and the projections engage with each other to restrict the movement of the spacer 400 in the first direction, only one of the spacer 400 and the insulating member 120 may have a projection, and the projection may engage with the other of the spacer 400 and the insulating member 120 to restrict the movement of the spacer 400 in the first direction. That is, at least one of the spacer 400 and the insulating member 120 has the projection that restricts the movement of the spacer 400 to the inner side of the container 100 (in the first direction).

As shown in FIG. 10 and FIG. 11B, the first upper face 413*a* of the first restriction part 413 of the spacer 400 is disposed below the coupling part 148 of the positive electrode current collector 140 (minus side in the Z-axis direction). The first projection 413*b* of the first restriction part 413 is disposed lateral to the electrode assembly of the coupling part 148 (minus side in the X-axis direction).

Specifically, the spacer 400 is disposed such that the wall face of the spacer body 410 and the first projection 413*b* sandwich the coupling part 148 of the positive electrode current collector 140. That is, the coupling part 148 is inserted between the wall face of the spacer body 410 and the first projection 413*b* with a small pressure.

In this manner, the first restriction part 413 engages with the coupling part 148 of the positive electrode current collector 140 to restrict the movement of the positive electrode current collector 140 in the first direction (X-axis direction) and the second direction (Z-axis direction). Specifically, the first upper face 413*a* engages with the coupling part 148 (or the side face of the first projection 413*b* engages with the coupling part 148) to restrict the movement of the positive electrode current collector 140 in the second direction.

That is, the first upper face 413*a* contacts a lower face of the coupling part 148 to restrict the movement of the positive electrode current collector 140 in the second direction. Here, the lower face (face in contact with the first upper face 413*a*) of the coupling part 148 is a plane vertical to the second direction (plane parallel to the XY plane).

The first projection 413*b* engages with the coupling part 148 (or the wall face of the spacer body 410 contacts the coupling part 148) to restrict the movement of the positive electrode current collector 140 in the first direction.

As described above, the coupling part 148 contacts the first restriction part 413 of the spacer 400 to restrict the movement of the positive electrode current collector 140. That is, the spacer 400 contacts the coupling part 148 to restrict the movement of the positive electrode current collector 140 in the second direction. The first restriction part 413 may contact the coupling part 148 at all times, or the first restriction part 413 may not contact the coupling part 148 normally and may contact the coupling part 148 only in the case of restricting the movement of the positive electrode current collector 140.

As shown in FIG. 10, the second upper faces 414*a* and 414*b* of the inner restriction part 414 are disposed below the inner electrode assembly-connection parts 144 and 145 of the positive electrode current collector 140. That is, the spacer 400 is arranged with respect to the positive electrode current collector 140 such that tips of the inner electrode assembly-connection parts 144 and 145 are arranged above the second upper faces 414*a* and 414*b*, for example, the inner electrode assembly-connection parts 144 and 145 are mounted on the second upper faces 414*a* and 414*b*.

The second upper faces 414*a* and 414*b* of the inner restriction part 414 engage with the tips of the inner electrode assembly-connection parts 144 and 145 of the positive electrode current collector 140 to restrict the movement of the positive electrode current collector 140 in the second direction (Z-axis direction). That is, the inner restriction part 414 contacts the tips of the inner electrode assembly-connection parts 144 and 145 to restrict the movement of the positive electrode current collector 140 in the second direction.

The third upper faces 421*a* and 431*a* of the outer restriction parts 421 and 431 are disposed below the outer electrode assembly-connection parts 142 and 143 of the positive electrode current collector 140. That is, the spacer 400 is arranged with respect to the positive electrode current collector 140 such that tips of the outer electrode assembly-connection parts 142 and 143 are arranged above the third upper faces 421*a* and 431*a*, for example, the outer electrode assembly-connection parts 142 and 143 are arranged on the third upper faces 421*a* and 431*a*.

The third upper faces 421*a* and 431*a* of the outer restriction parts 421 and 431 engage with tips of the outer electrode assembly-connection parts 142 and 143 of the positive electrode current collector 140 to restrict the movement of the positive electrode current collector 140 in the second direction (Z-axis direction). That is, the outer restriction parts 421 and 431 contact the tips of the outer electrode assembly-connection parts 142 and 143 to restrict the movement of the positive electrode current collector 140 in the second direction.

As described above, the first restriction part 413, the inner restriction part 414, and the outer restriction parts 421 and 431 of the spacer 400 contact a side part of the electrode assemblies of the positive electrode current collector 140 (first direction of the electrode assemblies, that is, the X-axis plus direction) in the second direction that is the longitudinal direction of the electrode assembly-connection parts of the positive electrode current collector 140 to restrict the movement of the positive electrode current collector 140 with respect to the spacer 400 in the second direction (or movement of the spacer 400 with respect to the positive electrode current collector 140).

As shown in FIG. 12, the restriction part-adjacent part 415 protrudes toward the second electrode assembly 162, and is disposed between the ends 162*a* and 162*b* of the second electrode assembly 162. Specifically, the end 162*a* and the inner electrode assembly-connection part 144 are disposed between the restriction part-adjacent part 415 and the first restriction part 413, and the end 162*b* and the outer electrode assembly-connection part 142 are disposed between the restriction part-adjacent part 415 and the spacer side wall 420.

Similarly, the restriction part-adjacent part 416 protrudes toward the first electrode assembly 161, and is disposed between the ends 161*a* and 161*b* of the first electrode assembly 161. Specifically, the end 161*b* and the inner electrode assembly-connection part 145 are disposed between the restriction part-adjacent part 416 and the first restriction part 413, and the end 161*a* and the outer electrode assembly-connection part 143 are disposed between the restriction part-adjacent part 416 and the spacer side wall 430.

In this manner, the restriction part-adjacent parts 415 and 416 position the spacer 400 with respect to the first electrode assembly 161 and the second electrode assembly 162 to which the positive electrode current collector 140 is connected.

Next, a process of manufacturing the energy storage device 10 by arranging the insulating members 120 and 130, the positive electrode current collector 140, the negative electrode current collector 150, and the spacers 400 and 500 will be described in detail.

Figure 13A:
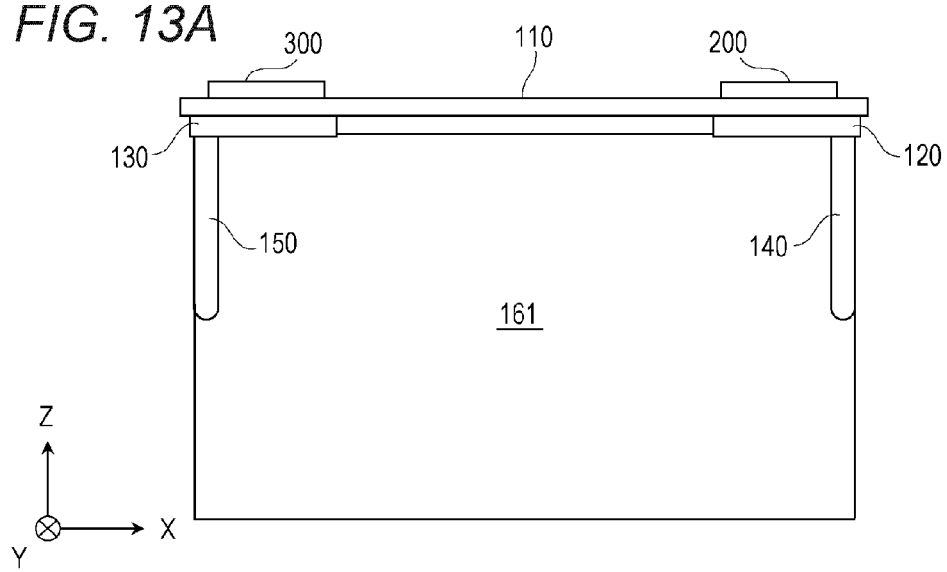
FIG. 13A and FIG. 13B are views showing a process of manufacturing the energy storage device by arranging the insulating members, the positive electrode current collector, the negative electrode current collector, and the spacer.
Figure 13B:
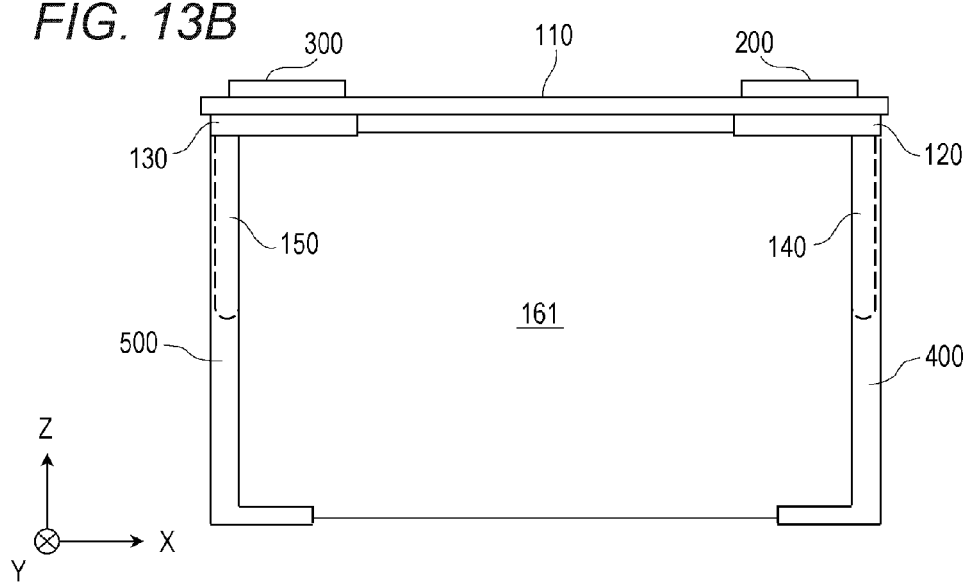
Figure 14:
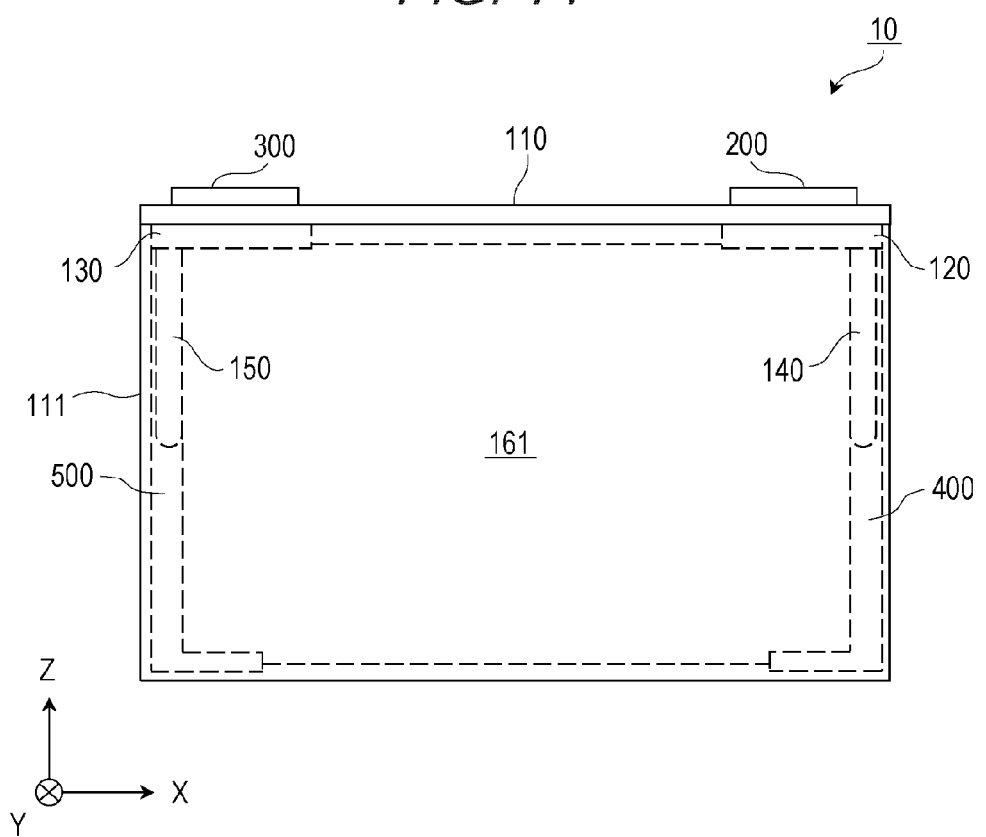
FIG. 14 is a view showing the process of manufacturing the energy storage device by arranging the insulating members, the positive electrode current collector, the negative electrode current collector, and the spacer.

FIG. 13A-FIG. 13B and FIG. 14 are views showing the process of manufacturing the energy storage device 10 by arranging the insulating members 120 and 130, the positive electrode current collector 140, the negative electrode current collector 150, and the spacers 400 and 500 in accordance with the embodiment of the present invention.

First, as shown in FIG. 13A, the insulating members 120 and 130, the positive electrode current collector 140, and the negative electrode current collector 150 are disposed at the first electrode assembly 161 and the second electrode assembly 162. Specifically, the insulating member 120 and the positive electrode current collector 140 are fixed to the positive electrode terminal 200 via the lid 110 by swaging or the like. The insulating member 130 and the negative electrode current collector 150 are fixed to the negative electrode terminal 300 via the lid 110 by swaging or the like. Then, the positive electrode current collector 140 and the negative electrode current collector 150 are connected to the first electrode assembly 161 and the second electrode assembly 162 by ultrasonic welding or the like.

As shown in FIG. 13B, the spacer 400 is disposed lateral to the positive electrode current collector 140, and the spacer 500 is disposed lateral to the negative electrode current collector 150. At this time, the parts of the spacer 400, such as the second projection 412, the first restriction part 413, the inner restriction part 414, and the outer restriction parts 421 and 431, are disposed as shown in FIG. 10 to FIG. 12.

That is, the second projection 412 is inserted into the gap between the engagement part 122b of the insulating member 120 and the terminal connection part 141 of the positive electrode current collector 140, thereby being sandwiched between the engagement part 122b and the terminal connection part 141. The first restriction part 413 is arranged by inserting the coupling part 148 of the positive electrode current collector 140 into a gap between the wall face of the spacer body 410 and the first projection 413b. The inner restriction part 414, and the outer restriction parts 421 and 431 are disposed below the respective tips of the electrode assembly-connection parts of the positive electrode current collector 140. The same also applies to the spacer 500.

As shown in FIG. 14, the insulating members 120 and 130, the positive electrode current collector 140, the negative electrode current collector 150, the spacers 400 and 500, the first electrode assembly 161, and the second electrode assembly 162 are stored in the container body 111 of the container 100. Then, the container body 111 is connected to the lid 110 by welding or the like to seal the container body 111, producing the energy storage device 10.

As described above, the energy storage device 10 in accordance with the embodiment of the present invention includes the electrode assembly-connection parts among the plurality of electrode assembly-connection parts (the outer electrode assembly-connection parts 142 and 143 and the inner electrode assembly-connection parts 144 and 145) connected to one or more electrode assemblies (the first electrode assembly 161 and the second electrode assembly 162), and the positive electrode current collector 140 having the reinforcement parts 146 and 147 that are connected to the terminal connection part 141 electrically connected to the positive electrode terminal 200 and increase the strength of the connection between the electrode assembly-connection parts and the terminal connection part 141. In the case where the electrode assembly suspends from the positive electrode current collector 140, when an excessive load acts on the connection between the electrode assembly-connection parts connected to the electrode assembly and the terminal connection part 141 connected to the positive electrode terminal 200, the positive electrode current collector 140 may be deformed, or the connection may be damaged. However, in the positive electrode current collector 140 of the energy storage device 10, because the reinforcement parts 146 and 147 increase the strength of the connection between the electrode assembly-connection parts and the terminal connection part 141, even when the electrode assembly suspends, deformation of the positive electrode current collector 140 or damage of the connection between the electrode assembly-connection part and the terminal connection part 141 can be prevented. For this reason, even the energy storage device 10 having the configuration in which the electrode assembly suspends from the positive electrode current collector 140 can increase the vibration resistance or the shock resistance.

In the positive electrode current collector 140, two electrode assembly-connection parts are connected to the positive electrode or the negative electrode of one electrode assembly to hold the one electrode assembly. This configuration has a higher strength than the configuration in which one electrode assembly is held by one electrode assembly-connection part. For this reason, the energy storage device 10 having the configuration in which a plurality of electrode assemblies suspend from the positive electrode current collector 140 can increase the vibration resistance or the shock resistance.

The two electrode assembly-connection parts connected to one electrode assembly have different strengths of the connections with the terminal connection part 141. Here, in the case where both the two electrode assembly-connection parts have a high strength of the connections with the terminal connection part 141, a stress acts on the connection between the electrode assembly and the positive electrode current collector 140, possibly breaking the foil of the electrode assembly. On the contrary, in the case where both the two electrode assembly-connection parts have a low strength of the connections with the terminal connection part 141, the positive electrode current collector 140 can be bent at the connections between the electrode assembly-connection parts and the terminal connection part 141. For this reason, by making the strength of the connection between one of the two electrode assembly-connection parts and the terminal connection part 141 high, and the strength of the connection between the other electrode assembly-connection part and the terminal connection part 141 low, the balance can be kept, preventing breakage of the foil of the electrode assembly and deformation of the positive electrode current collector 140. Upon application of a large external shock, the side of high strength can prevent deformation of the positive electrode current collector 140, and shock can be escaped to the side of low strength.

The positive electrode current collector 140 is formed such that the strength of the connection between the outermost electrode assembly-connection parts and the terminal connection part 141 is higher than the strength of the connection between the other electrode assembly-connection parts and the terminal connection part 141. For this reason, the strength of the positive electrode current collector 140 can be increased by increasing the strength of the outer connection that receives the largest load, thereby preventing deformation and damage to achieve a high vibration resistance or shock resistance.

In the positive electrode current collector 140, one electrode assembly is held by two electrode assembly-connection parts, and the reinforcement parts 146 and 147 are connected to at least one of the two electrode assembly-connection parts. This can increase the strength of the positive electrode current collector 140 to prevent deformation and damage.

In the positive electrode current collector 140, the reinforcement parts 146 and 147 are connected to the outermost electrode assembly-connection parts among the plurality of electrode assembly-connection parts. The strength of the positive electrode current collector 140 can be increased by forming the reinforcement parts 146 and 147 at the outer side that receives the largest load, preventing deformation and damage. The reinforcement parts 146 and 147 can be readily formed by processing them from the outer side.

In the positive electrode current collector 140, the reinforcement parts 146 and 147 are connected to the side face of the terminal connection part 141 and the outermost electrode assembly-connection parts. Thus, the electrode assembly-connection parts can be rigidly fixed to the terminal connection part 141, preventing deformation and damage.

The positive electrode current collector 140 is formed to have thin connected portions of the electrode assembly-connection parts with the electrode assembly. Thus, the electrode assembly-connection parts can be readily connected to the electrode assembly from the side of the electrode assembly-connection parts by welding or the like.

In the positive electrode current collector 140, the coupling part 148 coupling the two electrode assembly-connection parts to each other is disposed between the two electrode assemblies. That is, the coupling part 148 couples the two electrode assembly-connection parts connected to the two different two electrode assemblies. Thus, even when the two electrode assemblies swing due to vibration or the like, the swinging of the two electrode assembly-connection parts can be suppressed to increase the strength of the two electrode assembly-connection parts, preventing deformation or damage of the positive electrode current collector 140.

The energy storage device 10 has the spacer 400 that contacts a part of the positive electrode current collector 140 to restrict the movement of the positive electrode current collector 140, and the spacer 400 can prevent the positive electrode current collector 140 from swinging due to vibration or shock at collision. Therefore, even the energy storage device 10 having the configuration in which the plurality of electrode assemblies suspend from the positive electrode current collector 140, the spacer 400 can suppress swinging of the positive electrode current collector 140, preventing deform or damage of the positive electrode current collector 140 to achieve a high vibration resistance or shock resistance.

The first restriction part 413 of the spacer 400, which serves to restrict the movement of the positive electrode current collector 140, protrudes toward the electrode assembly, reinforcing the spacer 400. Therefore, the first restriction part 413 can suppress swinging of the positive electrode current collector 140 while reinforcing the spacer 400, preventing deformation or damage of the positive electrode current collector 140.

Because the first restriction part 413 of the spacer 400 is configured to be disposed between two adjacent electrode assemblies, the spacer 400 can be positioned with respect to the electrode assemblies by disposing the first restriction part 413 between the two electrode assemblies.

The spacer 400 contacts the coupling part 148 that couples two adjacent electrode assembly-connection parts of the positive electrode current collector 140 to each other to restrict the movement of the positive electrode current collector 140. Thus, because the spacer 400 can be readily brought into contact with a part of the positive electrode current collector 140, deformation or damage of the positive electrode current collector 140 can be prevented with simple configuration.

Because the first restriction part 413 has the first projection 413*b* on the electrode assembly side of the coupling part 148, the first restriction part 413 can restrict the movement of the coupling part 148 toward the electrode assembly. The first projection 413*b* can restrict the movement of the positive electrode current collector 140 toward the electrode assembly.

The spacer 400 has the inner restriction part 414 that contacts the inner electrode assembly-connection parts 144 and 145 of the positive electrode current collector 140 to restrict the movement of the positive electrode current collector 140, and the inner restriction part 414 can readily bring the spacer 400 into contact with a part of the positive electrode current collector 140. For this reason, deformation or damage of the positive electrode current collector 140 can be prevented with simple configuration.

The inner restriction part 414 of the spacer 400 protrudes toward the electrode assembly, thereby reinforcing the spacer 400. Therefore, the inner restriction part 414 can suppress swinging of the positive electrode current collector 140 while reinforcing the spacer 400, preventing deformation or damage of the positive electrode current collector 140.

The spacer 400 has the outer restriction parts 421 and 431 that contact the outer electrode assembly-connection parts 142 and 143 of the positive electrode current collector 140 to restrict the movement of the positive electrode current collector 140 and thus, the outer restriction parts 421 and 431 can readily bring the spacer 400 into contact with a part of the positive electrode current collector 140. Thus, deformation or damage of the positive electrode current collector 140 can be prevented with simple configuration.

One end of the spacer 400 directly or indirectly contacts the bottom face of the container 100, preventing swinging of the spacer 400 in the container 100. Restricting the movement of the spacer 400 with respect to the container 100 can also restrict the movement of the positive electrode current collector 140 with respect to the container 100, preventing swinging of the positive electrode current collector 140 in the container 100.

At least one of the spacer 400 disposed lateral to the positive electrode current collector 140 and the fixation member fixed to the container 100 in the energy storage device 10 has the projections (the second projections 411 and 412 and the engagement parts 122*a* and 122*b*) that engage with the other to restrict the movement of the spacer 400 with respect to the container 100 in the first direction. Because the projections restrict the movement of the spacer 400 with respect to the container 100 in the first direction, the spacer 400 can prevent the positive electrode current collector 140 disposed lateral to the spacer 400 from swinging in the first direction due to vibration or shock at collision. Therefore, even the energy storage device 10 having the configuration in which a plurality of electrode assemblies suspend from the positive electrode current collector 140, the spacer 400 can suppress swinging of the positive electrode current collector 140, preventing deformation or damage of the positive electrode current collector 140 to achieve a high vibration resistance or shock resistance.

Because the insulating member 120 that isolates the positive electrode current collector 140 from the container 100 can be used as the fixation member fixed to the container 100, the movement of the spacer 400 with respect to the container 100 can be restricted with simple configuration.

Because the spacer 400 can be detached from the insulating member 120, the spacer 400 can be arranged on the insulating member 120 with simple configuration.

Because the second projections 411 and 412 of the spacer 400 engage with the engagement parts 122*a* and 122*b* of the insulating member 120 to restrict the movement of the spacer 400 in the first direction, the movement of the spacer 400 with respect to the container 100 can be restricted with simple configuration.

Because the second projections 411 and 412 of the spacer 400 can be detachably arranged between the engagement parts 122*a* and 122*b* of the insulating member 120 and the positive electrode current collector 140, the movement of the spacer 400 with respect to the container 100 can be further restricted with simple configuration.

Because the insulating member 120, the positive electrode current collector 140, and the spacer 400 have the same configuration as the insulating member 130, the negative electrode current collector 150, and the spacer 500, respectively, the insulating member 130, the negative electrode current collector 150, and the spacer 500 can achieve the same effects as those of the insulating member 120, the positive electrode current collector 140, and the spacer 400.

Modification Example 1

Next, a modification example 1 of the embodiment will be described.

Figure 15:
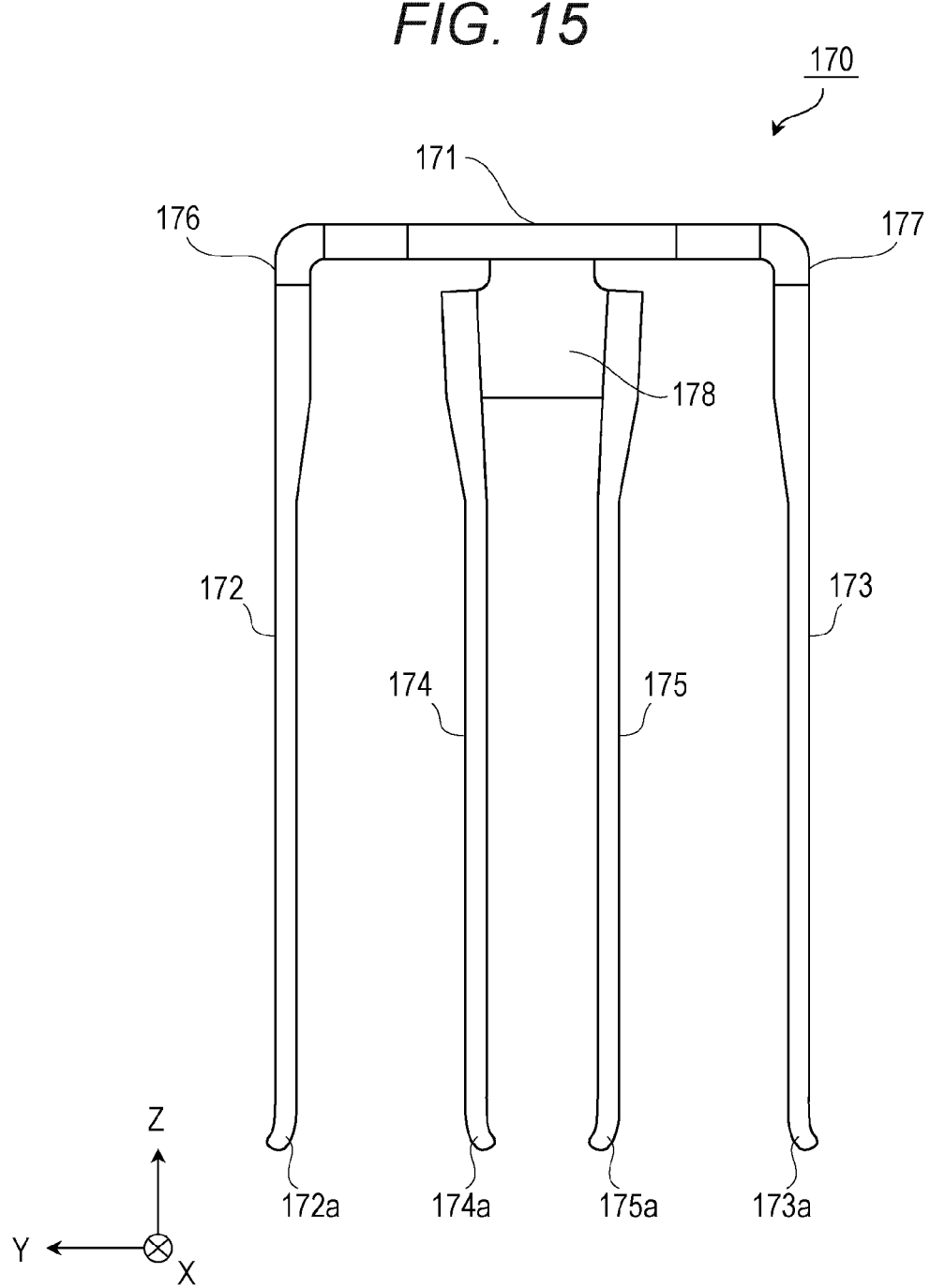
FIG. 15 is a front view showing a positive electrode current collector in accordance with a modification example 1 when viewed from the front.

FIG. 15 is a front view showing a positive electrode current collector 170 in accordance with the modification example 1 of the embodiment of the present invention when viewed from the front (minus side in the X-axis direction).

As shown in this figure, the positive electrode current collector 170 has a terminal connection part 171, outer electrode assembly-connection parts 172 and 173, inner electrode assembly-connection parts 174 and 175, reinforcement parts 176 and 177, and a coupling part 178. Here, the terminal connection part 171, the reinforcement parts 176 and 177, and the coupling part 178 have the same configuration as the terminal connection part 141, reinforcement parts 146 and 147, and the coupling part 148 in the positive electrode current collector 140 in the embodiment, respectively. Thus, description thereof is omitted.

The outer electrode assembly-connection parts 172 and 173 have tips 172a and 173a, respectively, front ends of which are bent outward. That is, the outer electrode assembly-connection part 172 has the tip 172a, a front end of which is bent toward the plus side in the Y-axis direction, and the outer electrode assembly-connection part 173 has the tip 173a, s front end of which is bent toward the minus side in the Y-axis direction.

Specifically, the tips 172a and 173a of the outer electrode assembly-connection parts 172 and 173 are bent toward the third upper faces 421a and 431a of the outer restriction parts 421 and 431 of the spacer 400.

In other words, the tip 172a of the outer electrode assembly-connection part 172 is bent away from the second electrode assembly 162, and the tip 173a of the outer electrode assembly-connection part 173 is bent away from the first electrode assembly 161. Thereby, the tips 172a and 173a contact the outer restriction parts 421 and 431 to restrict the movement of the positive electrode current collector 140 in the second direction (Z-axis direction).

The inner electrode assembly-connection parts 174 and 175 have tips 174a and 175a, respectively, front ends of which are bent inward. That is, the inner electrode assembly-connection part 174 has the tip 174a, a front end of which is bent toward the minus side in the Y-axis direction, and the inner electrode assembly-connection part 175 has the tip 175a, a front end of which is bent toward the plus side in the Y-axis direction.

Specifically, the tips 174a and 175a of the inner electrode assembly-connection parts 174 and 175 are bent toward the second upper faces 414a and 414b of the inner restriction part 414 of the spacer 400.

In other words, the tip 174a of the inner electrode assembly-connection part 174 is bent away from the second electrode assembly 162, and the tip 175a of the inner electrode assembly-connection part 175 is bent away from the first electrode assembly 161. Thereby, the tips 174a and 175a contact the second upper faces 414a and 414b of the inner restriction part 414 to restrict the movement of the positive electrode current collector 170 in the second direction (Z-axis direction).

As described above, in the positive electrode current collector 170, the tips of the electrode assembly-connection parts are bent away from the respective electrode assemblies. That is, the tip 172a of the outer electrode assembly-connection part 172 and the tip 174a of the inner electrode assembly-connection part 174 are bent away from the second electrode assembly 162, and the tip 173a of the outer electrode assembly-connection part 173 and the tip 175a of the inner electrode assembly-connection part 175 are bent away from the first electrode assembly 161.

As described above, the energy storage device in accordance with the modification example 1 of the embodiment of the present invention can achieve the same effect as the effect of the energy storage device in the embodiment. Especially, even in the case where the outer electrode assembly-connection parts 172 and 173 are not disposed immediately above the third upper faces 421a and 431a, the tips 172a and 173a of the outer electrode assembly-connection parts 172 and 173 can be disposed immediately above the third upper faces 421a and 431a. Similarly, even in the case where the inner electrode assembly-connection parts 174 and 175 are not disposed immediately above the second upper faces 414a and 414b, the tips 174a and 175a of the inner electrode assembly-connection parts 174 and 175 can be disposed immediately above the second upper faces 414a and 414b.

By bringing the tips 172a and 173a bent toward the outer restriction parts 421 and 431 into contact with the outer restriction parts 421 and 431, the outer electrode assembly-connection parts 172 and 173 of the positive electrode current collector 170 can readily contact the spacer 400. Therefore, deformation or damage of the positive electrode current collector 170 can be prevented with simple configuration to achieve a high vibration resistance or shock resistance.

By bringing the tips 174a and 175a bent toward the inner restriction part 414 into contact with the inner restriction part 414, the inner electrode assembly-connection parts 174 and 175 of the positive electrode current collector 170 can readily contact the spacer 400. Therefore, deformation or damage of the positive electrode current collector 170 can be prevented with simple configuration to achieve a high vibration resistance or shock resistance.

The negative electrode current collector 150 can be configured in the same manner.

Modification Example 2

Next, a modification example 2 of the embodiment will be described.

Figure 16:
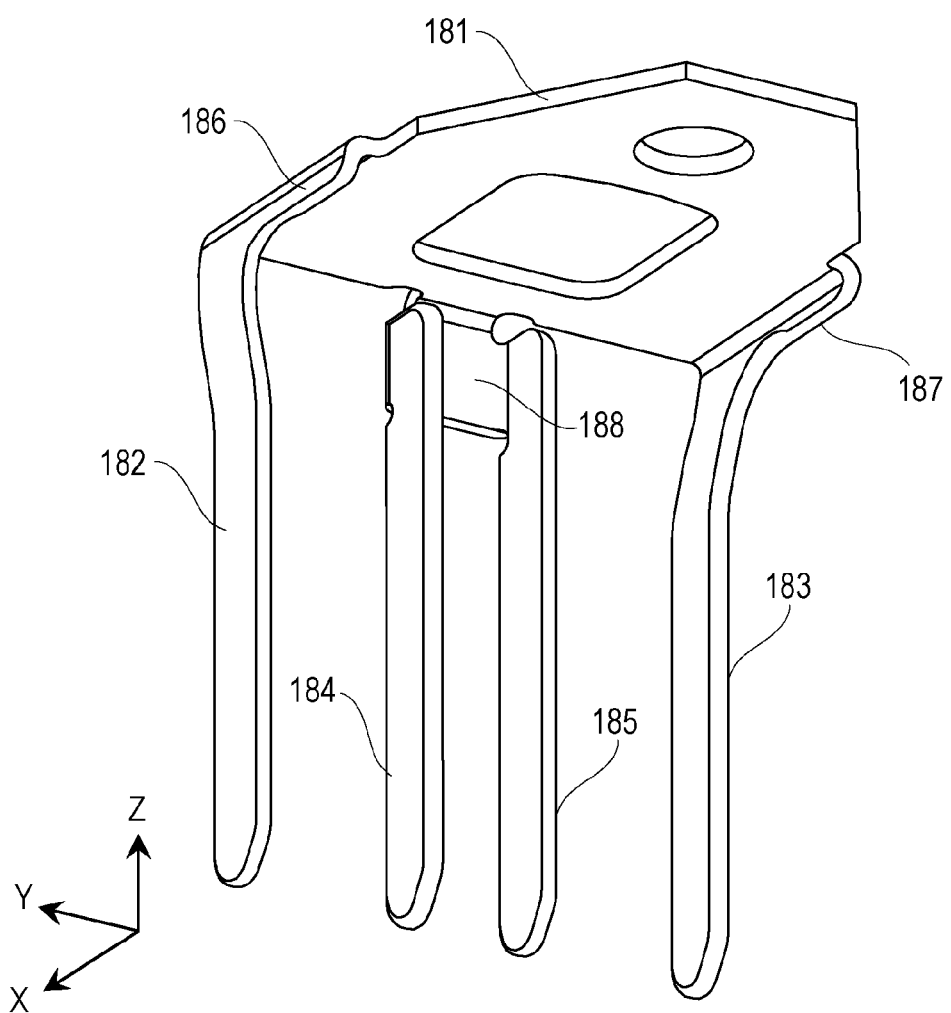
FIG. 16 is a perspective view showing configuration of a positive electrode current collector in accordance with a modification example 2.
Figure 17:
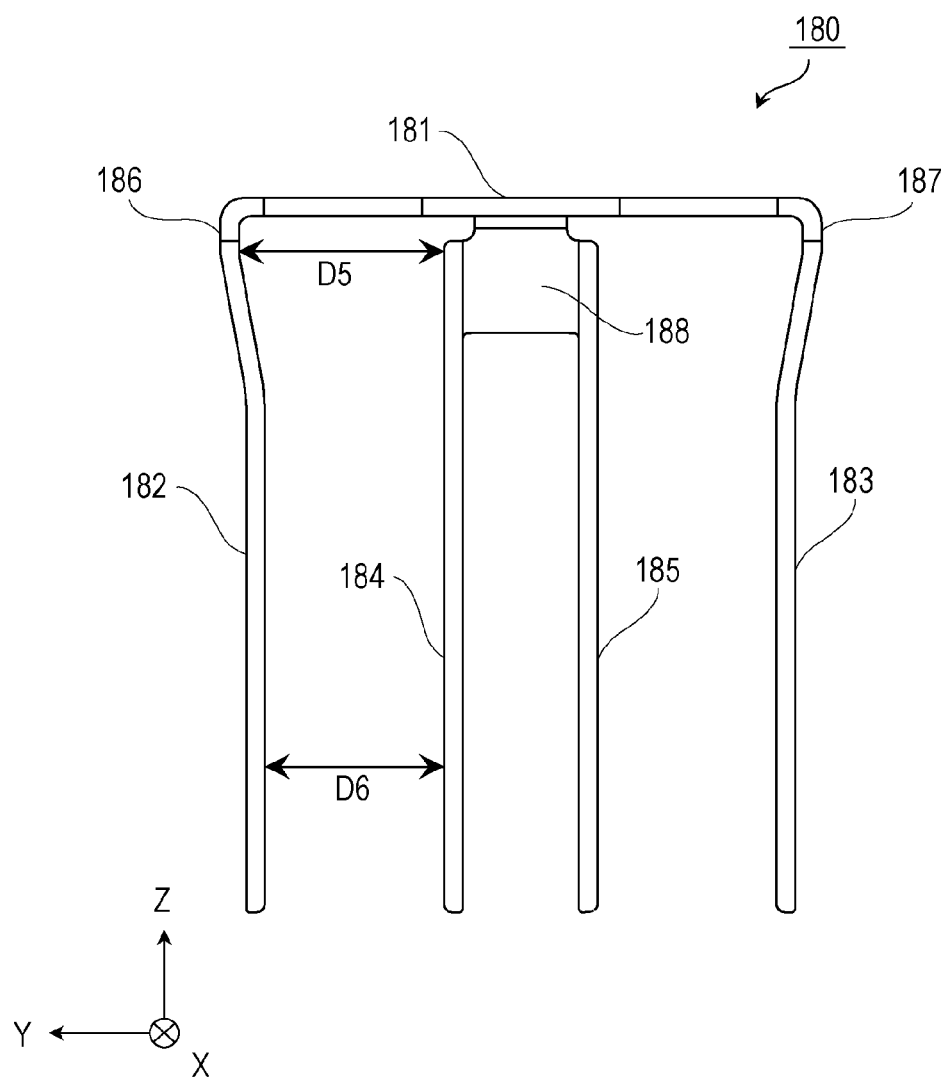
FIG. 17 is a front view showing the positive electrode current collector in accordance with the modification example 2 when viewed from the front.
Figure 18:
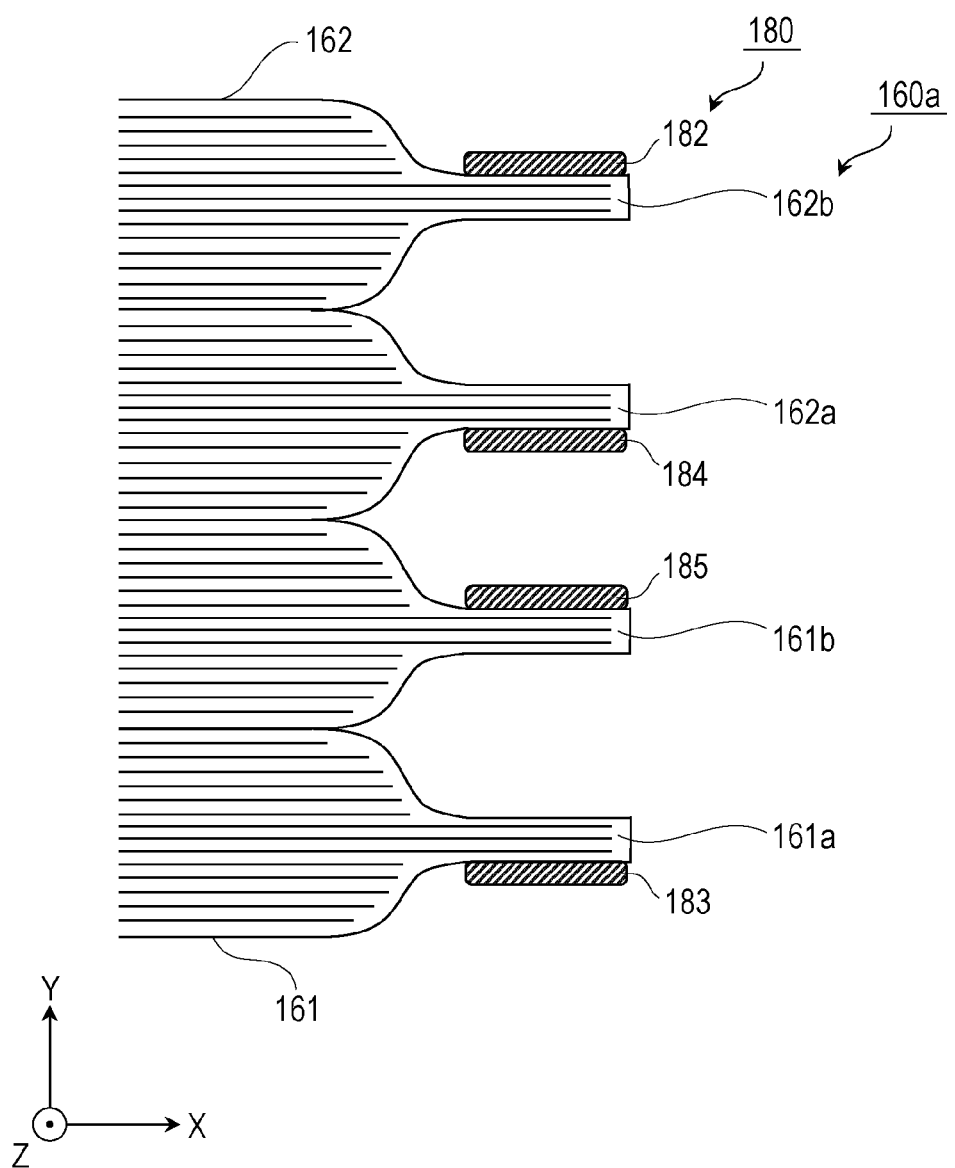
FIG. 18 is a sectional view showing the positive electrode current collector connected to the first electrode assembly and the second electrode assembly in accordance with the modification example 2.

FIG. 16 is a perspective view showing configuration of a positive electrode current collector 180 in accordance with the modification example 2 of the embodiment of the present invention. FIG. 17 is a front view showing the positive electrode current collector 180 in accordance with the modification example 2 of the embodiment of the present invention when viewed from the front (minus side in the X-axis direction). FIG. 18 is a sectional view showing configuration of the positive electrode current collector 180 connected to the first electrode assembly 161 and the second electrode assembly 162 in accordance with the modification example 2 of the embodiment of the present invention.

As shown in these figures, the positive electrode current collector 180 has a terminal connection part 181, outer electrode assembly-connection parts 182 and 183, inner electrode assembly-connection parts 184 and 185, reinforcement parts 186 and 187, and a coupling part 188. Here, because the terminal connection part 181, the reinforcement parts 186 and 187, and the coupling part 188 have the same configuration as the terminal connection part 141, the reinforcement parts 146 and 147, and the coupling part 148 in the positive electrode current collector 140 in the embodiment, description thereof is omitted.

A distance between the outer electrode assembly-connection part 182 and the inner electrode assembly-connection part 184 is smaller on the opposite side to the terminal connection part 181. That is, a distance D6 between the outer electrode assembly-connection part 182 and the inner electrode assembly-connection part 184 on the opposite side to the terminal connection part 181 is smaller than a distance D5 between the outer electrode assembly-connection part 182 and the inner electrode assembly-connection part 184 on the side of the terminal connection part 181.

Similarly, a distance between the outer electrode assembly-connection parts 183 and the inner electrode assembly-connection parts 185 is smaller on the opposite side to the terminal connection part 181. That is, a distance between the outer electrode assembly-connection part 183 and the inner electrode assembly-connection part 185 on the opposite side to the terminal connection part 181 is smaller than a distance between the outer electrode assembly-connection part 183 and the inner electrode assembly-connection part 185 on the side of the terminal connection part 181.

As described above, the distance between two electrode assembly-connection parts connected to one electrode assembly is smaller on the opposite side to the terminal connection part 181. That is, the two electrode assembly-connection parts have the distance therebetween that is smaller on the electrode assembly than on the positive electrode terminal 200.

As described above, the energy storage device in accordance with the modification example 2 of the embodiment of the present invention can achieve the same effect as the effect of the energy storage device in the embodiment. The negative electrode current collector 150 can be configured in the same manner.

The positive electrode current collector 180 is formed such that the distance between two electrode assembly-connection parts connected to one electrode assembly is smaller on the opposite side to the terminal connection part 181 (connected portion with the electrode assembly). Here, although the two electrode assembly-connection parts each are preferably connected at the center of the laminated metal foils of the electrode assembly, the distance between the two electrode assembly-connection parts may be larger than the distance between the two laminated metal foils. In this case, by making the distance between the two electrode assembly-connection parts small, as shown in FIG. 18, the two electrode assembly-connection parts each can be connected at the center of the laminated metal foils of the electrode assembly. That is, in the case where the metal foils of the electrode assembly are bundled, the ends 162b and 161a can be disposed at the center in the Y-axis direction, and can be connected to the outer electrode assembly-connection parts 182 and 183, respectively. This can properly connect the positive electrode current collector 180 to the electrode assembly.

Because the distance between the outer electrode assembly-connection parts 182 and 183 can be reduced, extension of the first electrode assembly 161 and the second electrode assembly 162 in the Y-axis direction can be prevented, facilitating insertion of the first electrode assembly 161 and the second electrode assembly 162 into the container body 111 of the container 100.

Although the thickness of the electrode assembly-connection parts is constant in this modification example 2, as in the embodiment, at least one electrode assembly-connection part among the plurality of electrode assembly-connection parts may be thin at the connected portion with the electrode assembly.

Modification Example 3

Next, a modification example 3 of the embodiment will be described.

Figure 19:
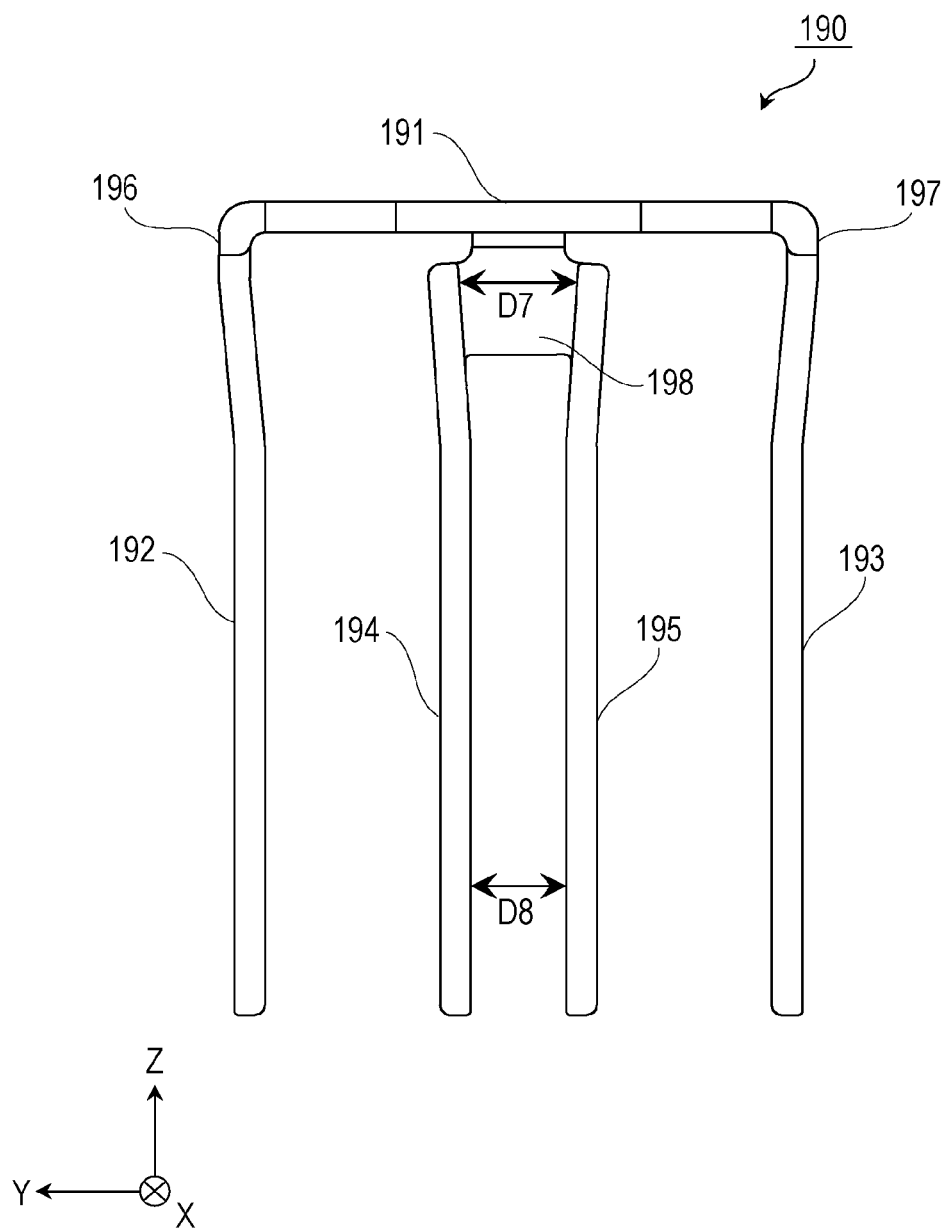
FIG. 19 is a front view showing a positive electrode current collector in accordance with a modification example 3 when viewed from the front.

FIG. 19 is a front view showing a positive electrode current collector 190 in accordance with the modification example 3 of the embodiment of the present invention when viewed from the front (minus side in the X-axis direction).

As shown in this figure, the positive electrode current collector 190 has a terminal connection part 191, outer electrode assembly-connection parts 192 and 193, inner electrode assembly-connection parts 194 and 195, reinforcement parts 196 and 197, and a coupling part 198. Here, since the terminal connection part 191, the reinforcement parts 196 and 197, and the coupling part 198 have the same configuration as the terminal connection part 141, the reinforcement parts 146 and 147, and the coupling part 148 in the positive electrode current collector 140 in the embodiment, description thereof is omitted.

The distance between the outer electrode assembly-connection part 192 and the inner electrode assembly-connection part 194 is constant, and the distance between the outer electrode assembly-connection part 193 and the inner electrode assembly-connection part 195 is also constant. The distance between the inner electrode assembly-connection part 194 and the inner electrode assembly-connection part 195 is smaller on the opposite side to the terminal connection part 191. That is, a distance D8 between the inner electrode assembly-connection part 194 and the inner electrode assembly-connection part 195 on the opposite side to the terminal connection part 191 is smaller than a distance D7 between the inner electrode assembly-connection part 194 and the inner electrode assembly-connection part 195 on the side of the terminal connection part 191.

As described above, the energy storage device in accordance with the modification example 3 of the embodiment of the present invention can achieve the same effect as the effect of the energy storage device in the embodiment. It is especially effective in the case where the positive electrode current collector 190 can be properly connected to the electrode assembly by making the distance between two inner electrode assembly-connection parts small. Also in this modification example 3, at least one electrode assembly-connection part among the plurality of electrode assembly-connection parts is thin at the connected portion with the electrode assembly. The negative electrode current collector 150 may be configured in the same manner.

Modification Example 4

Next, a modification example 4 of the embodiment will be described.

Figure 20:
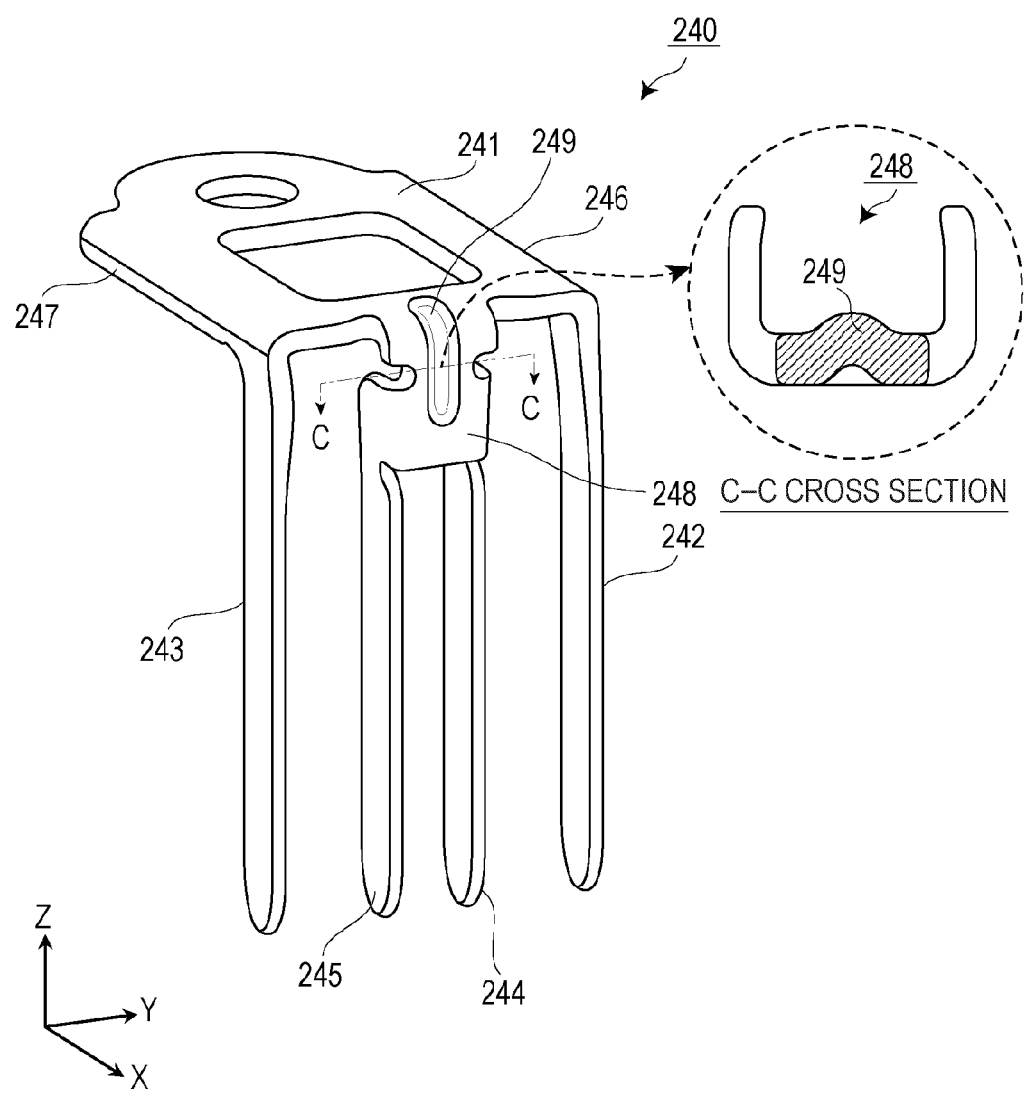
FIG. 20 is a perspective view showing configuration of a positive electrode current collector in accordance with a modification example 4.

FIG. 20 is a perspective view showing configuration of a positive electrode current collector 240 in accordance with the modification example 4 of the embodiment of the present invention.

As shown in this figure, the positive electrode current collector 240 has a terminal connection part 241, outer electrode assembly-connection parts 242 and 243, inner electrode assembly-connection parts 244 and 245, reinforcement parts 246 and 247, and a coupling part 248. Because the terminal connection part 241, the outer electrode assembly-connection parts 242 and 243, the inner electrode assembly-connection parts 244 and 245, and the reinforcement parts 246 and 247 have the same configuration as the terminal connection part 141, the outer electrode assembly-connection parts 142 and 143, the inner electrode assembly-connection parts 144 and 145, and the reinforcement parts 146 and 147 in the positive electrode current collector 140 in the embodiment, description thereof is omitted.

The coupling part 248 includes a bead part 249. Specifically, the bead part 249 is a reinforcement part formed in the coupling part 248 to increase the strength of the coupling part 248. That is, because the strength of a connection between the inner electrode assembly-connection parts 244 and 245, and the terminal connection part 241 is lower than the strength of the outer electrode assembly-connection parts 242 and 243 provided with the reinforcement parts 246 and 247, in the case where the difference between the inner side and the outer side in the connection strength is large, the difference can be adjusted, for example, by forming the bead part 249.

In this manner, the coupling part 248 functions as a reinforcement part connected to the inner electrode assembly-connection parts 244 and 245 and the terminal connection part 241 to reinforce the connection between the inner electrode assembly-connection parts 244 and 245, and the terminal connection part 241.

The bead part 249 extends in the center of the coupling part 248 in the vertical direction (Z-axis direction), and protrudes toward the inner side (minus side in the X-axis direction) of the positive electrode current collector 240. That is, the bead part 249 is formed as a bead that is concave on the outer face of the coupling part 248 (plus side in the X-axis direction) and is convex on the inner face of the coupling part 248 (minus side in the X-axis direction).

The bead part 249 may be formed of a bead that is convex on the outer face of the coupling part 248 (plus side in the X-axis direction) and is concave on the inner face of the coupling part 248 (minus side in the X-axis direction). The bead part 249 may have one convex face and the other planar face without a concave shape.

As described above, the energy storage device in accordance with the modification example 4 of the embodiment of the present invention can achieve the same effect as the effect of the energy storage device in the embodiment. Because the coupling part 248 has the bead part 249, the strength of the positive electrode current collector 240 can be increased to achieve a high vibration resistance or shock resistance. The negative electrode current collector 150 can be figured in the same manner.

Modification Example 5

Next, a modification example 5 of the embodiment will be described.

Figure 21:
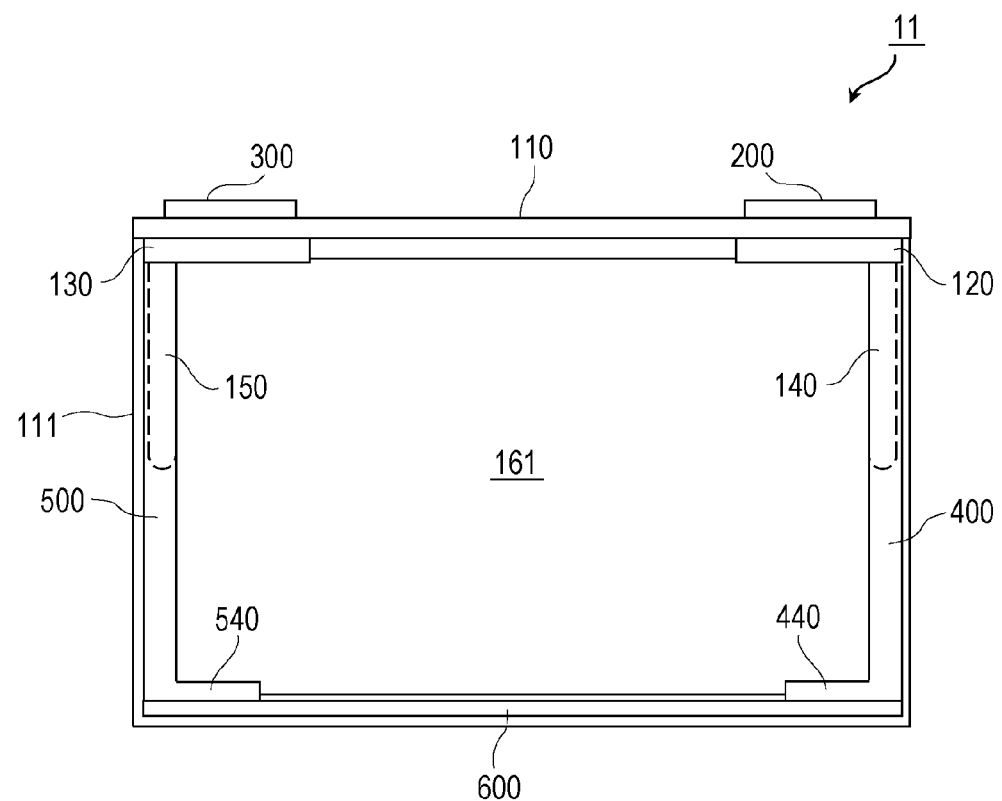
FIG. 21 is a view schematically showing configuration of an energy storage device in accordance with a modification example 5.

FIG. 21 is a view schematically showing configuration of an energy storage device 11 in accordance with the modification example 5 of the embodiment of the present invention. This figure is a plan view showing the inside of the container 100 when viewed from the minus side in the Y-axis direction through the container body 111.

As shown in this figure, the energy storage device 11 in accordance with this modification example includes a bottom spacer 600 in addition to the components of the energy storage device 10 in accordance with the embodiment. The other configuration is the same as the configuration of the energy storage device 10 in the embodiment and thus, detailed description thereof is omitted.

The bottom spacer 600 is a flat plate-like insulating member disposed on the bottom face of the container 100 (the bottom face of the container body 111) and below spacers 400 and 500 as two side spacers opposed to each other across the electrode assembly. Specifically, the bottom spacer 600 is connected to a spacer bottom face 440 of the spacer 400 and a spacer bottom face 540 of the spacer 500 to couple the spacer bottom face 440 to the spacer bottom face 540.

That is, because the bottom spacer 600 is fixed to the spacer bottom face 440 and the spacer bottom face 540, the two spacers 400 and 500 opposed to each other across the electrode assembly are coupled to each other on the bottom face of the container 100.

For example, the energy storage device 11 can be produced by attaching the spacer 400 and the spacer 500 to the positive electrode current collector 140 and the negative electrode current collector 150, respectively, from both sides of the electrode assembly and then, fixing the bottom spacer 600 to the spacer bottom face 440 and the spacer bottom face 540.

The bottom spacer 600 may be fixed to the spacer bottom face 440 and the spacer bottom face 540 by any method including engagement, welding, deposition, bonding, and screwing. The shape of the bottom spacer 600 is not specifically limited and may be a rod. The material for the bottom spacer 600 may be any insulating material.

The spacers 400 and 500 only need to be coupled to each other on the bottom face of the container 100, and the bottom spacer 600 is not necessarily fixed to the spacer bottom faces 440 and 540. That is, for example, in the case where the spacers 400 and 500 have no spacer bottom faces 440 and 540, the bottom spacer 600 may be fixed to lower ends of the spacers 400 and 500.

As described above, the energy storage device 11 in accordance with the modification example 5 of the embodiment of the present invention can achieve the same effect as the effect of the energy storage device in the embodiment. Especially because the two spacers 400 and 500 opposed across the electrode assembly are coupled to each other on the bottom face of the container 100, even when external vibration or shock acts on the energy storage device 11, a high vibration resistance or shock resistance can be achieved.

Although the energy storage devices in accordance with the embodiment of the present invention and its modification examples have been described, the present invention is not limited to the embodiment and the modification examples. That is, the disclosed embodiment and the modification examples should be considered as being illustrative rather than restrictive in all respects. The scope of the present invention is indicated by Claims, not the above description, and includes equivalents to Claims and all modifications in the scope of Claims.

For example, although the reinforcement part is connected to one of the two electrode assembly-connection parts connected to one electrode assembly in the embodiment and the modification example, two reinforcement parts may be connected to the two respective electrode assembly-connection parts. That is, the reinforcement part connected to the inner electrode assembly-connection part and the terminal connection part may be provided.

Although the reinforcement part is connected to the outer electrode assembly-connection part in the embodiment and the modification examples, the reinforcement part may be connected to the inner electrode assembly-connection part rather than the outer electrode assembly-connection part.

Although the reinforcement part is connected to the side face of the terminal connection part and the outer electrode assembly-connection part in the embodiment and the modification example, the reinforcement part may be connected to the back face of the terminal connection part and the outer electrode assembly-connection part.

Although the coupling part of the current collector is disposed between two adjacent electrode assemblies in the embodiment and the modification example, the coupling part may be disposed lateral to the electrode assembly, and need not be disposed between the two electrode assemblies.

Although the first restriction part of the spacer is disposed between two adjacent electrode assemblies in the embodiment and the modification example, the first restriction part may be disposed lateral to the electrode assembly, and need not be disposed between the two electrode assemblies.

Although the current collector is connected to the electrode terminal by swaging with a connection part in the embodiment and the modification example, they may be connected to each other in any method other than swaging.

Although the energy storage device includes the two electrode assemblies in the embodiment and the modification example, the energy storage device may include only one electrode assembly, or include three or more electrode assemblies. That is, the energy storage device only needs to include one or more electrode assemblies, the plurality of electrode assembly-connection parts of the current collector only need to be connected to the one or more electrode assemblies.

Figure 22:
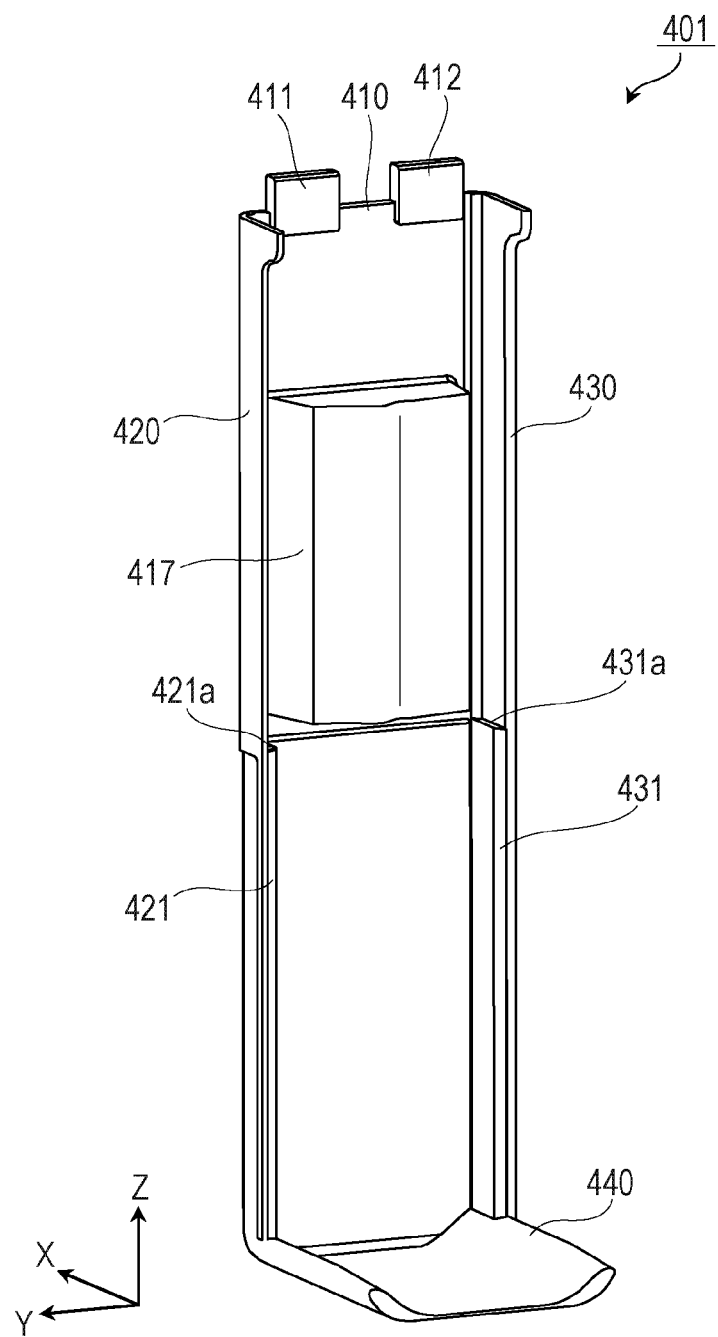
FIG. 22 is a perspective view showing configuration of a spacer in accordance with another modification example.

FIG. 22 shows an example of a spacer in an energy storage device having only one electrode assembly. FIG. 22 is a perspective view showing configuration of a spacer 401 in accordance with another modification example of the embodiment of the present invention.

As shown in this figure, the spacer 401 in accordance with this modification example includes a protrusion part 417 in place of the first restriction part 413, the inner restriction part 414, and the restriction part-adjacent parts 415, 416, and 417 of the spacer 400 in the embodiment. That is, since the energy storage device in accordance with this modification example includes only one electrode assembly, one current collector includes only two electrode assembly-connection parts. Thus, the spacer 401 has the outer restriction parts 421 and 431 as second restriction parts that contact the two electrode assembly-connection parts to restrict the movement of the current collector, but does not have the first restriction part 413 and the inner restriction part 414.

Specifically, as in the embodiment, the outer restriction parts 421 and 431 protrude toward the electrode assembly, and the third upper faces 421a and 431a are second restriction parts that contact (engage with) tips of the two electrode assembly-connection parts of the positive electrode current collector to restrict the movement of the positive electrode current collector in the second direction (the longitudinal direction of the electrode assembly-connection parts, Z-axis direction). Thereby, the spacer 401 can suppress swinging of the positive electrode current collector, preventing deformation or damage of the positive electrode current collector to achieve a high vibration resistance or shock resistance.

Although the energy storage device includes only one electrode assembly, and the spacer has second restriction parts without including the first restriction part in this modification example, the spacer may have the first restriction part without including the second restriction part. That is, for example, in the energy storage device including two or more electrode assemblies, the spacer having the first restriction part without including the second restriction part can prevent swinging of the current collector, achieving a high vibration resistance or shock resistance.

Although the two electrode assembly-connection parts of the current collector are connected to one electrode assembly in the embodiment and the modification examples, the number of the electrode assembly-connection parts connected to one electrode assembly is not limited, and may be one, or three or more.

Although the second direction is the Z-axis direction in the embodiment and the modification examples, the second direction may be any direction intersecting the first direction (X-axis direction). That is, the second direction may be the Y-axis direction, or any direction intersecting the X-axis direction.

Although the negative electrode current collector and the positive electrode current collector have the same configuration in the embodiment and the modification examples, only the positive electrode current collector may have the configuration. Alternatively, only the negative electrode current collector may have the configuration.

Although the fixation member fixed to the container is the insulating member that isolates the current collector from the container in the embodiment and the modification examples, the fixation member may be any member fixed to the container, and is not limited to the insulating member.

Any combination of the embodiment and the modification examples is included in the scope of the present invention. For example, the modification in the modification example 1 may be made in the modification example 2 or 3, the modification in the modification example 4 may be made in the modification examples 1 to 3, and the modification in the modification example 5 may be made in the modification examples 1 to 4. The present invention can be embodied as the above-mentioned energy storage device as well as the current collector, the spacer, or the insulating member in the energy storage device.

The present invention can be applied to energy storage devices including a lithium ion secondary battery.

What is claimed is:

1. An energy storage device, comprising:
an electrode terminal;
a plurality of electrode assemblies;
a current collector configured to electrically connect the electrode terminal to the electrode assemblies; and
a container configured to store the electrode assemblies and the current collector, the container including:
  a lid on which the electrode terminal is disposed, the lid being formed in a rectangular shape having a short side; and
  a container body including a side wall extending from the short side of the lid,
wherein the current collector includes a terminal connection part connected to the electrode terminal, a plurality of electrode assembly-connection parts connected to the electrode assemblies, and a coupling part that couples two adjacent electrode assembly-connection parts of the plurality of electrode assembly-connection parts to each other, the terminal connection part extending substantially parallel to the lid and the electrode assembly-connection parts extending substantially vertically from the terminal connection part away from the lid,
wherein the energy storage device further includes a spacer disposed lateral to the electrode assembly-connection parts of the current collector, the spacer being disposed between the side wall and the electrode assemblies in a first direction that is perpendicular to the side wall and is substantially parallel to the lid,
wherein the spacer includes a first restriction part that protrudes in the first direction, the first restriction part being inserted between the electrode assemblies to extend along the side wall and being configured to abut against the coupling part in a second direction toward the lid, which is perpendicular to the first direction,
wherein the coupling part comprises a plate that extends between the two adjacent electrode assembly-connection parts in a third direction perpendicular to the first and second directions,
wherein the plate of the coupling part directly contacts the first restriction part, and
wherein the spacer is configured to restrict a movement of the current collector and electrode assemblies in the third direction.

2. The energy storage device according to claim 1, wherein the first restriction part includes a first projection disposed on an electrode assembly side of the coupling part.

3. The energy storage device according to claim 1, wherein the spacer includes a second restriction part that protrudes in a direction substantially parallel to the lid toward the electrode assemblies and configured to abut against a tip of the electrode assembly-connection parts in a direction toward the lid.

4. The energy storage device according to claim 1, wherein the coupling part couples the two adjacent electrode assembly-connection parts of the plurality of electrode assembly-connection parts to each other in the third direction.

5. The energy storage device according to claim 1, wherein the plurality of electrode assemblies are stacked in the third direction.

6. The energy storage device according to claim 1, wherein the plurality of electrode assemblies are stacked in a same direction that the plate of the coupling part extends between the two adjacent electrode assembly-connection parts to couple the two adjacent electrode assembly-connection parts to each other.

7. The energy storage device according to claim 1, wherein a side surface of the plate of the coupling part directly contacts the spacer.

8. The energy storage device according to claim 7, wherein another side surface of the plate of the coupling part extends between the two adjacent electrode assembly-connection parts to couple the two adjacent electrode assembly-connection parts to each other, said another side surface of the plate of the coupling part opposing the side surface of the plate of the coupling part.

9. An energy storage device, comprising:
an electrode terminal;
a plurality of electrode assemblies;
a current collector configured to electrically connect the electrode terminal to the electrode assemblies; and
a container configured to store the electrode assemblies and the current collector, the container including:
a lid on which the electrode terminal is disposed, the lid being formed in a rectangular shape having a short side; and
a container body including a side wall extending from the short side of the lid,
wherein the current collector includes a terminal connection part connected to the electrode terminal, an electrode assembly-connection part connected to the electrode assemblies, and a coupling part disposed between the electrode assemblies, the terminal connection part extending in a direction substantially parallel to the lid and the electrode assembly-connection part extending substantially vertically from the terminal connection part away from the lid,
wherein the energy storage device further includes a spacer disposed lateral to the electrode assembly-connection part of the current collector, the spacer being disposed between the side wall and the electrode assemblies in a first direction that is perpendicular to the side wall and is substantially parallel to the lid,
wherein the spacer includes a restriction part that protrudes in the first direction, the restriction part being inserted between the electrode assemblies to extend along the side wall and being configured to abut against a tip of the electrode assembly-connection part in a second direction toward the lid, which is perpendicular to the first direction,
wherein the coupling part comprises a plate that extends through the electrode assembly-connection part in a third direction perpendicular to the first and second directions,
wherein the plate of the coupling part directly contacts the restriction part, and
wherein the spacer is configured to restrict a movement of the current collector and electrode assemblies in the third direction.

10. An energy storage device, comprising:
an electrode terminal;
a plurality of electrode assemblies;
a current collector configured to electrically connect the electrode terminal to the electrode assemblies; and
a container configured to store the electrode assemblies and the current collector, the container including:
a lid on which the electrode terminal is disposed, the lid being formed in a rectangular shape having a short side; and
a container body including a side wall extending from the short side of the lid,
wherein the current collector includes:
a terminal connection part connected to the electrode terminal, and extending in substantially parallel to the lid;
a plurality of electrode assembly-connection parts connected to the electrode assemblies, and extending substantially vertically from the terminal connection part away from the lid; and
a coupling part that couples two adjacent electrode assembly-connection parts of the plurality of electrode assembly-connection parts to each other,
wherein the energy storage device further includes a spacer disposed between the side wall and the electrode assemblies in a first direction that is perpendicular to the side wall and is substantially parallel to the lid,
wherein the spacer includes a restriction part that protrudes in the first direction, the restriction part being inserted between the electrode assemblies to extend along the side wall and being configured to abut against the coupling part in a second direction toward the lid, which is perpendicular to the first direction, and wherein the coupling part comprises a plate that extends between the two adjacent electrode assembly-connection parts in a third direction which is perpendicular to the first and second directions.

11. The energy storage device according to claim 10, wherein the spacer includes a spacer body extending parallel to the short side of the lid, and
wherein the restriction portion protrudes from the spacer body in the first direction.

12. The energy storage device according to claim 11, wherein the container further includes a long side wall extending from a long side of the lid, and
wherein the spacer further includes a spacer side wall disposed, in the third direction, between the long side wall of the container and one of the electrode assemblies.

13. The energy storage device according to claim 12, wherein the spacer is configured to restrict a movement of the current collector and the electrode assemblies in the third direction.

\* \* \* \* \*